US007113846B2

(12) United States Patent
Moriyama et al.

(10) Patent No.: US 7,113,846 B2
(45) Date of Patent: Sep. 26, 2006

(54) SHEET HANDLING APPARATUS WHICH INSERTS INSERT SHEETS BETWEEN RECORDING SHEETS HAVING IMAGE FORMED THEREON, METHOD OF CONTROLLING SAME, IMAGE FORMING APPARATUS AND STORAGE MEDIUM THEREFOR

(75) Inventors: Tsuyoshi Moriyama, Toride (JP); Shinichi Nakamura, Kawasaki (JP); Naoyuki Ohki, Nerima-ku (JP); Mitsuo Nimura, Kashiwa (JP); Norifumi Miyake, Kashiwa (JP); Kiyoshi Okamoto, Toride (JP); Takayuki Fujii, Toshima-ku (JP)

(73) Assignee: Canon Kabushiki Kaisha, (JP)

( * ) Notice: Subject to any disclaimer, the term of this patent is extended or adjusted under 35 U.S.C. 154(b) by 0 days.

(21) Appl. No.: 09/737,280

(22) Filed: Dec. 15, 2000

(65) Prior Publication Data

US 2001/0018626 A1 Aug. 30, 2001

(30) Foreign Application Priority Data

Dec. 15, 1999 (JP) ................................ 11-355652
Dec. 16, 1999 (JP) ................................ 11-357217

(51) Int. Cl.
*G06F 7/00* (2006.01)

(52) U.S. Cl. ................ 700/223; 270/58.14; 270/58.23; 270/58.31

(58) Field of Classification Search ................ 700/220, 700/221, 223, 224, 227; 270/52.01, 58.08–58.17, 270/58.23, 58.31; 271/3.15
See application file for complete search history.

(56) References Cited

U.S. PATENT DOCUMENTS

| | | | | |
|---|---|---|---|---|
| 4,602,776 | A | 7/1986 | York et al. | 271/4 |
| 4,734,865 | A * | 3/1988 | Scullion et al. | 700/222 |
| 5,159,546 | A * | 10/1992 | Inoue et al. | 700/17 |
| 5,272,511 | A | 12/1993 | Conrad et al. | 355/325 |
| 5,435,544 | A * | 7/1995 | Mandel | 271/298 |
| 5,710,968 | A | 1/1998 | Clark et al. | 399/382 |
| 5,826,869 | A * | 10/1998 | Nyffenegger et al. | 270/52.02 |
| 6,625,508 | B1 * | 9/2003 | Purvis | 700/100 |

FOREIGN PATENT DOCUMENTS

JP 01 038374 A 2/1989

* cited by examiner

*Primary Examiner*—Gene O. Crawford
*Assistant Examiner*—Jeffrey Shapiro
(74) *Attorney, Agent, or Firm*—Rossi, Kimms & McDowell, LLP

(57) ABSTRACT

A sheet handling apparatus is provided, which is comprised of a plurality of inserter trays for stacking thereon insert sheets to be inserted between recording sheets having images formed thereon. Sheet feeding modes for feeding insert sheets include two kinds, i.e. S-stacking mode and F-stacking mode, that can be set by a mode key displayed on a sheet feeding mode setting screen view. In the S-stacking mode, only first-page insert sheets are stacked on a first inserter tray, and only second-page insert sheets and third-page insert sheets are stacked on second and third inserter trays, respectively. In the F-stacking mode, insert sheets are stacked in order of page on an inserter tray. Sheet feeding is suitably controlled by stacking insert sheets on inserter trays in manners corresponding to respective selected stacking modes.

45 Claims, 31 Drawing Sheets

S-STACKING MODE

F-STACKING MODE

ORIGINAL

SHEET HANDLING APPARATUS WHICH INSERTS INSERT SHEETS BETWEEN RECORDING SHEETS HAVING IMAGE FORMED THEREON, METHOD OF CONTROLLING SAME, IMAGE FORMING APPARATUS AND STORAGE MEDIUM THEREFOR

BACKGROUND OF THE INVENTION

1. Field of the Invention

The present invention relates to a sheet handling apparatus comprising a plurality of inserter trays for inserting insert sheets between recording sheets having images formed thereon, an image forming apparatus, and a method of controlling the same and a storage medium therefor.

2. Description of Related Art

Conventionally, when a set of plural originals consisting of a mixture of plural kinds of originals, for example, a mixture of colored originals and black-and-white originals, are to be copied, a user uses a color copying machine and copies all the originals with the color copying machine to obtain desired duplications of the color/black-and-white mixed originals. However, since image forming processing with the color copying machine requires a longer time than with a black-and-white copying machine, it is inefficient to process any black-and-white originals with the color copying machine. Thus, there arises a demand for copying the black-and-white originals separately with a black-and-white copying machine, one way to meet the demand would be that when a mixture of colored originals and black-and-white originals are to be copied, color originals and black-and-white originals should be separately copied with a color copying machine and a black-and-white copying machine, respectively.

However, in such a separate copying, the user has to separate in advance the color/black-and-white mixed originals into color originals and black-and-white originals. After copying has been completed, the color originals and the black-and-white originals have to be restored to the initial condition. This is very complicated and time-consuming, especially when the originals are not paged or when the originals are large in number. Besides, after copying, in order to arrange the copied recording sheets output from the black-and-white copying machine and the copied recording sheets output from the color copying machine in the order of the originals, it is necessary, for example, to insert the copied recording sheets from the color copying machine between the copied recording sheets from the black-and-white copying machine. This requires a very complicated manual operation which has to be performed manually while checking the order of the originals.

Thus, the conventional manner of copying color/black-and-white mixed originals separately with a color copying machine and a black-and-white copying machine has the disadvantage that a very complicated manual operation needs to be carried out by a user and the operation is difficult to correctly perform without error as well as very time-consuming.

To overcome the above-mentioned disadvantage, an image forming apparatus has already been proposed which includes a plurality of copying machines, for example, a color copying machine and a black-and-white copying machine, and an inserter tray. The mixed originals are subjected to copying processing by means of a combination of these components. The inserter tray is constructed, in general, as a sheet feeding tray that permits an insert sheet which is to be inserted between recording sheets having image formed thereon by an image forming section to be conveyed without passing through the image forming section.

According to the proposed apparatus, it is automatically determined whether each original of a set of mixed originals is a color original or not. A color original is automatically copied with the color copying machine, and a black-and-white original is automatically copied with the black-and-white copying machine. An insert sheet to be inserted between recording sheets is fed from the inserter tray so as to improve the efficiency of the processing operation.

However, in the above-described image forming apparatus including the inserter tray, the method of feeding insert sheets from the inserter tray can be set to output modes such as a cover sheet mode and a synthesis mode, but the manner of loading the insert sheets on the inserter tray is fixed so that optimal processing is not always possible to perform.

More specifically, in order to perform a copying process of plural kinds of originals efficiently in the shortest time, it is required to comprehensively take into account the capability (number of bins, loading capacity, etc.) of the sheet discharging sections (sorters, finishers etc.) of the color/black-and-white copying machines, and the number of bins, loading capacity, etc. of the inserter tray, so as to perform the processing in an optimal operating mode. In the conventional apparatus, however, the two copying machines are unable to know the status of each other's sheet discharging section or inserter tray, and hence are forced to operate, not in the optimal operating mode, but in a predetermined operating mode. Therefore, there is room for improvement in processing efficiency and operability.

SUMMARY OF THE INVENTION

The present invention has been made in order to solve the above-mentioned problems with the prior art, and it is an object of the present invention to provide a sheet handling apparatus and a method of controlling the same which are capable of setting a plurality of sheet feeding modes as desired to thereby improve processing efficiency and operability, an image forming apparatus, and a storage medium storing a program for executing the method.

To attain the above object, in a first aspect of the present invention, there is provided a sheet handling apparatus comprising a plurality of inserter trays for having insert sheets stacked thereon, the insert sheets being inserted between the recording sheets transported from an image forming apparatus having an image forming section, a sheet feeding controller that controls feeding of the insert sheets stacked on the plurality of inserter trays, and a sheet feeding mode setting device that sets one of a plurality of sheet feeding modes defining respectively a plurality of stacking manners for stacking plural types of the insert sheets on the plurality of inserter trays and a plurality of sheet feeding manners corresponding respectively to the stacking manners and employed by the sheet feeding controller.

Preferably, the sheet feeding controller controls feeding of the insert sheets stacked on the plurality of inserter trays in accordance with the sheet feeding mode set by the sheet feeding mode setting device.

In a preferred embodiment of the first aspect, the plurality of sheet feeding modes include at least a first sheet feeding mode in which a same type of insert sheets are stacked on each of the plurality of inserter trays, and a second sheet feeding mode in which plural types of the insert sheets are stacked together on at least one of the plurality of inserter trays.

Specifically, in the first sheet feeding mode, the sheet feeding controller sequentially feeds the insert sheets sheet by sheet from one of the plurality of inserter trays, and then changes an inserter tray from which the insert sheets are to be fed, from the one to a next one of the plurality of inserter trays. In the second sheet feeding mode, the sheet feeding controller sequentially feeds the plural types of the insert sheets stacked together on the at least one of the inserter trays sheet by sheet starting from a top page sheet of the insert sheets.

In a preferred embodiment of the first aspect, the sheet handling apparatus comprises an insert sheet number determining device that determines a total number of the insert sheets to be inserted between the recording sheets, a sheet stacking detector that detects presence or absence of the insert sheets stacked on each of the plurality of inserter trays, a comparator operable in the first sheet feeding mode to compare the total number of the insert sheets determined by the insert sheet number determining device with a total number of inserter trays on which presence of the insert sheets stacked thereon is detected by the sheet stacking detector, and a warning device that gives a predetermined warning if a result of the comparison by the comparator shows that the total number of the insert sheets does not coincide with the total number of the inserter trays.

Preferably, the insert sheet number determining device determines the total number of the insert sheets through manual input by a user.

More preferably, the sheet handling apparatus comprises an original reading device that reads images on a set of originals for forming images on the recording sheets, and a color original counter that recognizes color originals from the set of originals based on the images read by the original reading device and counts a number of the recognized color originals. The insert sheet number determining device determines the number of color originals counted by the color original counter as the total number of the insert sheets to be inserted between the recording sheets.

Further preferably, the sheet handling apparatus comprises an image formation inhibiting device that inhibits image formation by the image forming section while the counting of color originals is being carried out by the color original counter.

In another preferred embodiment of the first aspect, the sheet handling apparatus comprises a predetermined information reading device that reads predetermined information indicative of the sheet feeding mode recorded on a predetermined one of the insert sheets in advance, and the sheet feeding mode setting device sets the sheet feeding mode based on the predetermined information read by the predetermined information reading device.

Preferably, the predetermined information is recorded at a location outside an image formed region of the predetermined one of the insert sheets.

Also preferably, the predetermined information is recorded on a leading edge portion of the predetermined one of the insert sheets.

Preferably, the predetermined one of the insert sheets is a top one of the insert sheets stacked on each of the plurality of inserter trays.

More preferably, the predetermined information reading device is brought into a position close to the insert sheets to read the predetermined information.

Preferably, the sheet feeding controller comprises a driver for carrying out a sheet feeding operation for feeding the insert sheets stacked on the plurality of inserter trays, the driver being disposed to drive the predetermined information reading device.

More preferably, the reading by the predetermined information reading device is carried out in synchronism with the feeding of the insert sheets by the sheet feeding controller.

Also preferably, the predetermined information reading device comprises at least one light reflection type sensor, and the predetermined information comprises a mark with a color being different in brightness from color of the predetermined one of the insert sheets.

Advantageously, the sheet handling apparatus comprises an error display device that displays failure to read the predetermined information by the predetermined information reading device.

Also advantageously, the sheet handling apparatus comprises a re-stacking detector that detects re-stacking of the insert sheets on the plurality of inserter trays, and wherein the sheet feeding mode setting device is responsive to failure to read the predetermined information by the predetermined information reading device, for suspending setting of the sheet feeding mode until the re-stacking of the insert sheets is detected.

Alternatively, the sheet feeding mode setting device is responsive to failure to read the predetermined information by the predetermined information reading device, for setting the sheet feeding mode through manual setting by a user.

Preferably, the sheet handling apparatus comprises a recording sheet sheet feeding inhibiting device responsive to failure to set the sheet feeding mode based on the predetermined information read by the predetermined information reading device, for inhibiting feeding of the recording sheets.

Preferably, the sheet feeding mode setting device sets the sheet feeding mode through manual setting by a user.

Also preferably, the insert sheets stacked on the plurality of inserter trays are fed so as to bypass the image forming section.

To attain the above object, in a second aspect of the present invention, there is provided a method of controlling a sheet handling apparatus comprising a plurality of inserter trays for stacking insert sheets thereon, the insert sheets being inserted between the recording sheets transported from an image forming apparatus having an image forming section, comprising the steps of controlling feeding of the insert sheets stacked on the plurality of inserter trays, and setting one of a plurality of sheet feeding modes defining respectively a plurality of stacking manners for stacking plural types of the insert sheets on each of the plurality of inserter trays and a plurality of sheet feeding manners corresponding respectively to the stacking manners and employed by the step of controlling feeding the insert sheets.

To attain the above object, in a third aspect of the present invention, there is provided a machine readable storage medium storing a program for executing a method of controlling a sheet handling apparatus comprising a plurality of inserter trays for stacking insert sheets thereon, the insert sheets being inserted between the recording sheets transported from an image forming apparatus having an image forming section, the method comprising the steps of controlling feeding of the insert sheets stacked on the plurality of inserter trays, and setting one of a plurality of sheet feeding modes defining respectively a plurality of stacking manners for stacking plural types of the insert sheets on each of the plurality of inserter trays and a plurality of sheet feeding manners corresponding respectively to the stacking manners and employed by the step of controlling feeding the insert sheets.

To attain the above object, in a fourth aspect of the present invention, there is provided an image forming apparatus comprising at least one inserter tray for having insert sheets stacked thereon, the insert sheets being inserted between the recording sheets transported from an image forming apparatus having an image forming section, and a sheet feeder that feeds the insert sheets stacked on the inserter tray, a stacking manner input terminal that selects a desired stacking manner from at least two kinds of stacking manners, for stacking the insert sheets on the inserter tray, and a controller responsive to selection of a predetermined stacking manner by the stacking manner input terminal, for controlling the sheet feeder to feed the insert sheets from the inserter tray without interrupting a job being executed when insert sheets are re-stacked on the inserter tray after exhaustion of all the insert sheets stacked on the inserter tray.

Preferably, the at least two kinds of stacking manners include a first stacking manner in which a single type of insert sheets are stacked on the inserter tray, and a second stacking manner in which plural types of insert sheets are stacked on the inserter tray, and wherein the controller is responsive to selection of the second stacking manner by the stacking manner input terminal, for controlling the sheet feeder to feed the insert sheets from the inserter tray without interrupting the job being executed if insert sheets are re-stacked on the inserter tray after exhaustion of all the insert sheets stacked on the inserter tray.

Also preferably, the image forming apparatus according to the fourth aspect further comprises a reading device that reads images on originals, an image forming device provided in the image forming section, for forming images on the recording sheets based on the images read by the image reading device, a post processing device comprising the inserter tray, and the sheet feeder, the post processing device carrying out a post process of inserting the insert sheets which are fed so as to bypass the image forming device, between the recording sheets having the images formed thereon by the image forming device, and an insert information input terminal that inputs at least one inserting position of the recording sheets having the images formed thereon by the image forming device where the insert sheets are to be inserted, and wherein the inserter tray comprises a plurality of inserter trays, and wherein the controller controls an order of the plurality of inserter trays in which the insert sheets are fed from the plurality of inserter trays by the sheet feeder, based on information input from the stacking manner input terminal.

In a preferred embodiment of the fourth aspect, the inserter tray comprises a plurality of inserter trays, the image forming apparatus further comprising a plurality of insert sheet detectors provided in a fashion corresponding respectively to the plurality of inserter trays, for detecting presence or absence of at least one insert sheet on the inserter trays, and an insert mode selector that selects an insert mode for inserting the insert sheets between the recording sheets, and the controller is responsive to selection of the insert mode by the insert mode selector, for controlling the image forming device to start an image forming operation if at least one insert sheet is detected by any of the plurality of insert sheet detectors.

The controller controls the insert sheet detectors to determine presence or absence of insert sheets on the plurality of inserter trays in order from upper ones to lower ones in a vertical direction. Alternatively, the controller controls the insert sheet detectors to determine presence or absence of insert sheets on the plurality of inserter trays in order from lower ones to upper ones in a vertical direction.

Preferably, the at least two kinds of stacking manners include a first stacking manner in which a single type of insert sheets are stacked on the inserter tray, and a second stacking manner in which plural types of insert sheets are stacked on the inserter tray, the inserter tray comprising a plurality of inserter trays, the image forming apparatus further comprising a plurality of insert sheet detectors provided in a fashion corresponding respectively to the plurality of inserter trays, for detecting presence or absence of at least one insert sheet on the inserter trays, and an insert mode selector that selects an insert mode for inserting the insert sheets between the recording sheets, and wherein the controller is responsive to selection of the insert mode by the insert mode selector and selection of the second stacking manner by the stacking manner input terminal, for controlling the image forming device to start an image forming operation, if any of the plurality of insert sheet detectors detects at least one insert sheet.

In a preferred embodiment of the fourth aspect, the image forming apparatus further comprises an insert sheet detector that detects at least one insert sheet stacked on the inserter tray, and wherein the at least two kinds of stacking manners include a first stacking manner in which a single type of insert sheets are stacked on the inserter tray, and a second stacking manner in which plural types of insert sheets are stacked on the inserter tray, the inserter tray comprising one or a plurality of inserter trays, and wherein the controller is responsive to exhaustion of all the insert sheets stacked on the one or the plurality of inserter trays while the second stacking manner is selected by the stacking manner input terminal during outputting of the job and detection of re-stacking of at least one insert sheet on the one or the plurality of inserter trays by the insert sheet detector, for controlling the sheet feeder to start feeding the at least one insert sheet from the one or the plurality of inserter trays upon lapse of a predetermined period of time after the detection of re-stacking.

In another preferred embodiment of the fourth aspect, the image forming apparatus further comprises an insert sheet detector that detects at least one insert sheet stacked on the inserter tray, and a job restart input terminal for instructing restart of a job, and wherein the at least two kinds of stacking manners includes a first stacking manner in which a single type of insert sheets are stacked on the inserter tray, and a second stacking manner in which plural types of insert sheets are stacked on the inserter tray, the inserter tray comprising one or a plurality of inserter trays, and the controller is responsive to exhaustion of all the insert sheets stacked on the one or the plurality of inserter trays while the second stacking manner is selected by the stacking manner input terminal during outputting of the job and detection of re-stacking of at least one insert sheet on the one or the plurality of inserter trays by the insert sheet detector, for controlling the sheet feeder to feed the at least one insert sheet from the one or the plurality of inserter trays if the restart of the job is instructed by the job restart input terminal after the detection of re-stacking of the at least one insert sheet by the insert sheet detector.

To attain the above object, in a fifth aspect of the present invention, there is provided a sheet handling apparatus comprises at least one inserter tray for stacking thereon insert sheets to be inserted between recording sheets having images formed thereon in a main body of an image forming apparatus, and a sheet feeder for feeding the insert sheets stacked on the inserter tray, and when a predetermined stacking manner is selected from at least two kinds of stacking manners for stacking insert sheets on the inserter tray, the sheet feeder is controlled to feed insert sheets from the inserter tray without stopping a job being executed if the insert sheets stacked on the inserter tray are exhausted and thereafter insert sheets are re-stacked on the inserter tray.

To attain the above object, in a sixth aspect of the present invention, there is provided an insert control method applied to a sheet handling apparatus comprising at least one inserter tray for having insert sheets stacked thereon, the insert sheets being inserted between the recording sheets transported from an image forming section and a sheet feeder that feeds the insert sheets stacked on the inserter tray, the method comprising the steps of selecting a desired stacking manner from at least two kinds of stacking manners, for stacking the insert sheets on the inserter tray, and controlling the sheet feeder to feed the insert sheets from the inserter tray without interrupting a job being executed when insert sheets are re-stacked on the inserter tray after exhaustion of all the insert sheets stacked on the inserter tray while a predetermined stacking manner is selected by the stacking manner selecting step.

To attain the above object, in a seventh aspect of the present invention, there is provided a machine readable storage medium storing a program for executing an insert control method applied to a sheet handling apparatus comprising at least one inserter tray for having insert sheets stacked thereon, the insert sheets being inserted between the recording sheets transported from an image forming section and a sheet feeder that feeds the insert sheets stacked on the inserter tray, the insert control method comprising the steps of selecting a desired stacking manner from at least two kinds of stacking manners, for stacking the insert sheets on the inserter tray, and controlling the sheet feeder to feed the insert sheets from the inserter tray without interrupting a job being executed when insert sheets are re-stacked on the inserter tray after exhaustion of all the insert sheets stacked on the inserter tray while a predetermined stacking manner is selected by the stacking manner selecting step.

To attain the above object, in an eighth aspect of the present invention, there is provided a sheet handling apparatus comprising a plurality of inserter trays that hold insert sheets which are to be inserted between sheets transported from an image forming apparatus, a plurality of feeders that feed the insert sheets stacked on the inserter trays respectively, an instruction inputting terminal that inputs an instruction selecting one of a plurality of sheet feeding modes including a first mode for plural types of insert sheets stacked on the inserter trays respectively and a second mode for plural types of insert sheets stacked on at least one of the inserter trays, and a sheet feeding controller that controls the plurality of feeders to feed the insert sheets from the plurality of inserter trays in accordance with the instruction inputted from the instruction inputting terminal.

To attain the above object, in a ninth aspect of the present invention, there is provided a method of controlling a sheet handling apparatus including a plurality of inserter trays that hold insert sheets which are to be inserted between sheets transported from an image forming apparatus, and a plurality of feeders that feed the insert sheets stacked on the inserter trays respectively, the method comprising the steps of inputting an instruction selecting one of a plurality of sheet feeding modes including a first mode for plural types of insert sheets stacked on the inserter trays respectively and a second mode for plural types of insert sheets stacked on at least one of the inserter trays, and controlling the plurality of feeders to feed the insert sheets from the plurality of inserter trays in accordance with the instruction inputted from the instruction inputting terminal.

To attain the above object, in a tenth aspect of the present invention there is provided a machine readable storage medium storing a program for executing a method of controlling a sheet handling apparatus including a plurality of inserter trays that hold insert sheets which are to be inserted between sheets transported from an image forming apparatus, and a plurality of feeders that feed the insert sheets stacked on the inserter trays respectively, the method comprising the steps of inputting an instruction selecting one of a plurality of sheet feeding modes including a first mode for plural types of insert sheets stacked on the inserter trays respectively and a second mode for plural types of insert sheets stacked on at least one of the inserter trays, and controlling the plurality of feeders to feed the insert sheets from the plurality of inserter trays in accordance with the instruction inputted from the instruction inputting terminal.

The above and other objects, features and advantages of the present invention will become more apparent from the following detailed description taken in conjunction with the accompanying drawings.

DETAILED DESCRIPTION OF THE PREFERRED EMBODIMENTS

The present invention will now be described in detail with reference to the drawings showing embodiments thereof.

First Embodiment

Figure 2:
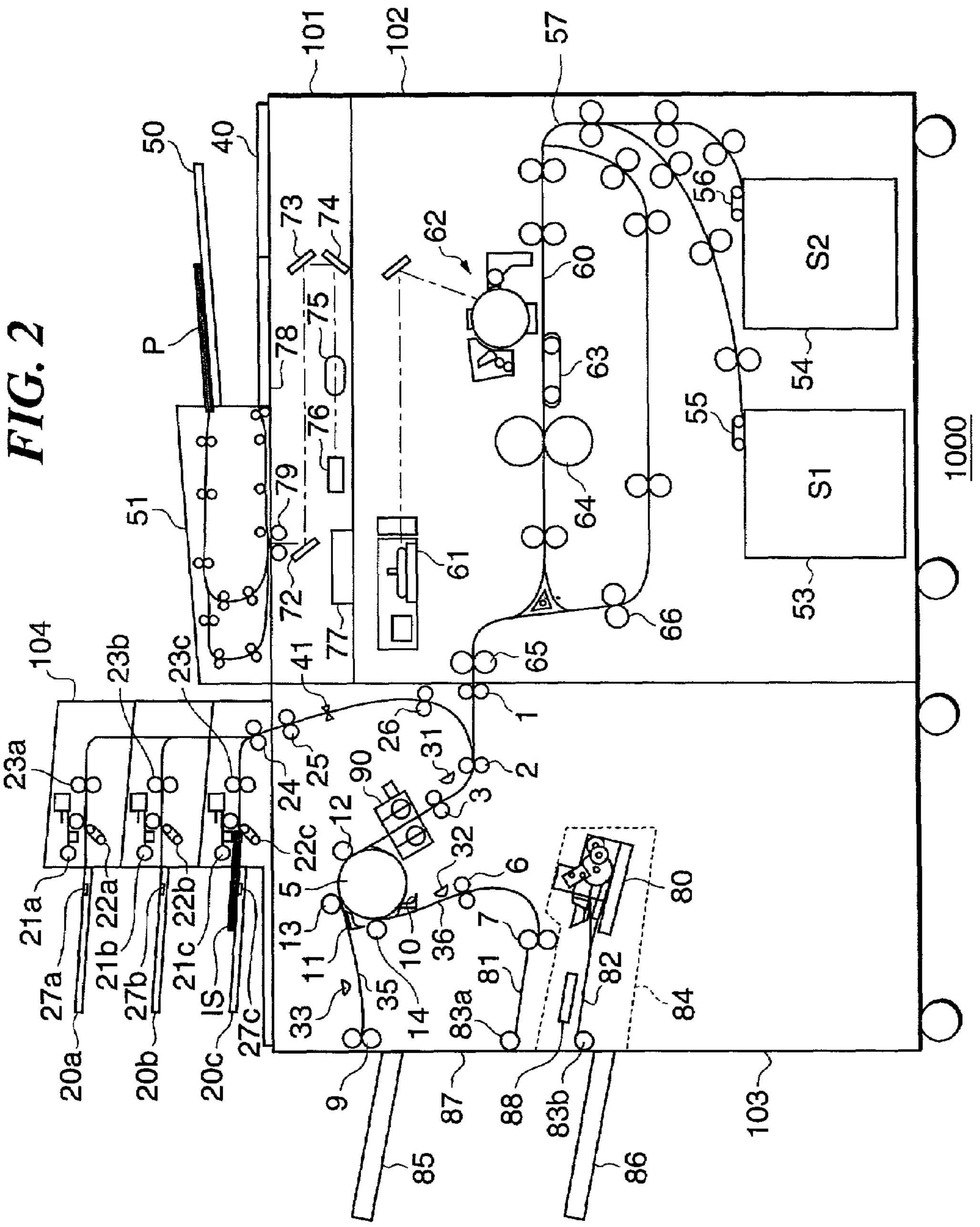
FIG. 2 is a sectional view showing the internal construction of the copying apparatus according to the first embodiment.

FIG. 2 is a sectional view showing the internal construction of a copying apparatus 1000 as an image forming apparatus according to a first embodiment of the present invention. The copying apparatus 1000 according to the first embodiment is comprised of a reading section 101, an image forming section 102, a sheet processing section 103, and an operating section 40 for setting operations to be performed by the image forming section 102 and the sheet processing section 103, confirming the set contents, and so forth.

Figure 3:
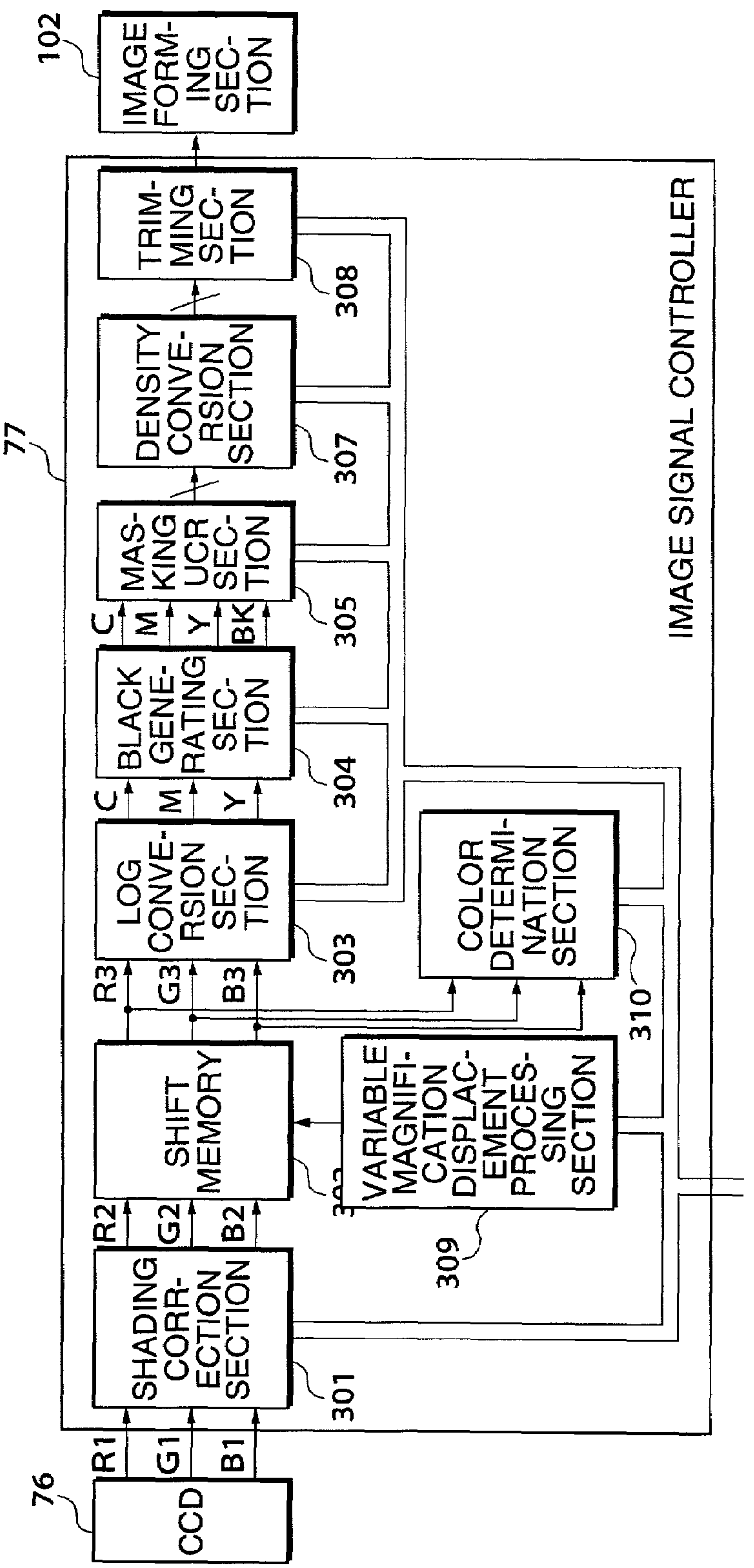
FIG. 3 is a block diagram showing the detailed construction of an image signal controller of a reading section of the copying apparatus according to the first embodiment.

More specifically, the reading section 101 is comprised of an automatic original feeder 51 that conveys originals P set on an original stacking tray 50 to an original reading position, performs reading of the originals in the original reading position, and conveys the originals read in the original reading position to an original discharging position, a lamp 79 for illuminating the originals P conveyed to the original reading position on a platen glass 78, a 3-line sensor (hereinafter referred to as CCD) 76 for reading an image, reflecting mirrors 72, 72, 74 that direct and guide reflected light from the originals P to the CCD 76, a lens 75 for focusing the reflected light from the originals P onto the CCD 76, and an image signal controller 77 having a construction as shown in FIG. 3, referred to later. The CCD 76 is comprised of color line sensors for obtaining analog color signals for R (red), G (green), and B (blue) independently, amplifiers for amplifying the respective color signals, and A/D converters for converting the respective analog color signals into 8-bit digital signals. The output signal from the CCD 76 is input to the image signal controller 77.

The image forming section 102 is comprised of recording sheet storing units 53 and 54 that store plural types of recording sheets S (S1, S2) of different sizes, and recording sheet feeders 55, 56 that feed the recording sheets S. A recording sheet S fed from the recording sheet feeder 55 or 56 is conveyed via a sheet conveyance path 57 to a sheet conveyance path 60. The image forming section 102 further includes a laser scanner 61 that scans a laser beam based on the image information of the original read by the reading section 101 to form a latent image on a photosensitive body of an image recorder 62, and the image recorder 62 that performs image forming processing by forming a toner image on the photosensitive body and transferring the toner image onto the recording sheet S. The recording sheet S that has image formed thereon by the image recorder 62 is conveyed via a conveyance belt 63, a fixing roller 64 that fixes the toner image on the recording sheet by softening and melting the same, and a conveyance roller 65, to the sheet processing section 103.

The sheet processing section (hereinafter referred to as the finisher) 103 is comprised of an entrance roller 1 for conveying the recording sheet S fed from the image forming section 102, and an inserter 104. The inserter 104 is provided for performing insert processing. The insert processing means an operation of feeding insert sheets IS set on trays 20*a* to 20*c* of the inserter 104 shown in FIG. 2 without passing them through the image forming section 102 to either a sample tray 85 or a stack tray 86 in order to insert the insert sheets IS between sheets conveyed to the finisher 103 from the image forming section 102.

The insert sheets IS are assumed to be placed by a user with the front surfaces or image formed surfaces facing upward on the trays 20*a* to 20*c* of the inserter 104, and to be fed by sheet feeding rollers 21*a* to 21*c* successively from the top. Therefore, sheets from the inserter 104 are conveyed via conveyance rollers 23*a* to 23*c*, 24, 25 as they are to either the sample tray 85 or the stack tray 86 so that they are discharged with front surfaces facing downward.

On the original stacking tray 50, a plurality of originals P are set by the user with front surfaces facing upward.

Reading operation is successively performed by the reading section 101, starting from the top original. When a recording sheet having an image formed thereon by the image forming section 102 is fed to the finisher 103 with the front surface facing downward, the recording sheet is once fed toward a conveyance roller 66 and then switched back to be fed to the finisher 103. When the recording sheet is fed to the finisher 103 with the front surface facing upward, the recording sheet is not fed toward the conveyance roller 66 so as not to be switched back, but is fed as it is to the finisher 103.

Thus, when insert processing is carried out using the inserter 104, the recording sheet is switched back on the image forming section 102 side to be fed to the finisher 103 with the front surface facing downward. The finisher 103 discharges the recording sheet to either the sample tray 85 or the stack tray 86 as it is, that is, with the front surface facing downward. In this way, the insert sheet IS from the inserter 104 and the recording sheets S from the image forming section 102 are controlled to have their surfaces facing in the same direction.

The inserter trays 20*a* to 20*c* are provided for setting insert sheets to be inserted, and may be comprised of, for example, three inserter trays 20*a*, 20*b*, and 20*c*. The number of the inserter trays is not limited to three, but may be any number as required.

The sheet feeding rollers 21*a* to 21*c* are provided for feeding insert sheets IS. The sheet feeding rollers 21*a* to 21*c* are normally in a standby position separated from the insert sheets. In timing for feeding sheets, a sheet feeding solenoid (not shown) is turned on, and the corresponding sheet feeding roller 21*a* to 21*c* is swung downward to be seated on the insert sheet IS. Separation rollers 22*a* to 22*c* are provided for separating the insert sheets IS fed from the respective sheet feeding rollers 21*a* to 21*c* from insert sheet bundles. Insert sheet set detecting sensors 2 detect whether the insert sheets IS are set on the respective trays 20*a* to 20*c* or not. The insert sheets IS from the separation rollers 22*a* to 22*c* are conveyed via respective conveyance rollers 23*a* to 23*c*, and via rollers 24 and 25 to a conveyance roller 2. An inserter pass sensor 41 detects the passage of the insert sheets IS.

The finisher 103 includes the conveyance roller 2 and a conveyance roller 3 for conveying recording sheets S and insert sheets IS, and a sheet detection sensor 31. The sheet detection sensor 31 is located on the entrance side for detecting the passage of the recording sheet S and the insert sheet IS conveyed from the conveyance roller 2. The finisher 103 also includes a punch unit 90 for punching the recording sheet S or the insert sheet IS conveyed from the conveyance roller 3 near the trailing edge thereof, and a buffer roller 5 disposed in an intermediate position in the conveyance path. At the periphery of the buffer roller 5, there are provided small depressing rollers 12, 13, 14 for depressing the recording sheet S to the rolling surface of the buffer roller 5 to cause the same to be conveyed.

A flapper 11 is provided for selecting either a non-sort path 35 or a sort path 36, and a flapper 10 is provided for selecting either a buffer path 34 or the sort path 36. The buffer path 34 temporarily halts the recording sheet S or the insert sheet IS by winding the same onto the buffer roller 5. A sheet detection sensor 33 detects the recording sheet S or the insert sheet IS on the non-sort path 35, and a sheet detection sensor 32 detects the recording sheet S or the insert sheet IS on the buffer path 34.

The finisher 103 also includes a conveyance roller 6 and a processing tray unit 84. The processing tray unit 84 is comprised of a processing tray 82 for temporarily accumulating the recording sheets S and the insert sheets IS, and aligning the accumulated recording sheets S and insert sheets IS, for staple processing, an aligning plate 88 for aligning the recording sheets S and the insert sheets IS accumulated in the processing tray 82, a staple unit 80 for performing staple processing on the recording sheets S and the insert sheets IS accumulated in the processing tray 82, and a bundle discharging roller 83*b* arranged at the discharging end of the processing tray 82.

A discharging roller 7 is arranged on the sort path 36 for discharging the recording sheets S or the insert sheets IS onto the stack tray 86 via the processing tray 82. A discharging roller 9 is arranged on the non-sort path 35 for discharging the recording sheets S or the insert sheets IS onto the sample tray 85. A bundle discharging roller 83*a* is supported by a rocking guide 81, for bundle-discharging the recording sheets S or the insert sheets IS on the processing tray 82 that are brought into pressure contact with the bundle discharging roller 83*a* when the rocking guide 81 is brought into a binding position, onto the stack tray 86. A bundle stacking guide 87 is disposed to abut against and supports the trailing edge (a trailing edge as viewed in the bundle discharging direction) of the sheet bundle stacked on the stack tray 86 or on the sample tray 85, and also serves as the exterior of the finisher 103.

The user starts the image forming processing by setting originals P on the original stacking tray 50 and executing necessary operations for the copying apparatus 1000 at the operating section 40. The copying apparatus 1000 performs, based on instructions from the user, reading operation on the originals P at the reading section 101, and at the same time, starts the image forming section 102 to feed recording sheets S from the recording sheet storing unit 53 or 54 and convey the recording sheets S via the sheet conveyance path 60 to the image recorder 62. The copying apparatus 1000 sends out data required for a sheet classification that is set at the operating section 40, and a finisher operation start signal to the finisher 103 to thereby start the operation of the finisher 103. Then, the copying apparatus 1000 performs the image forming processing based on the image information read out from the originals, by transferring the toner images onto the recording sheets conveyed to the image recorder 62, and fixing the toner images at the fixing unit. Then, at the finisher 103, sheet feeding of the insert sheets IS, classification of the sheets, and staple processing are performed.

FIG. 3 is a block diagram showing the detailed construction of the image signal controller 77 of the reading section 101 of the copying apparatus according to the first embodiment. The image signal controller 77 of the reading section 101 is comprised of a shading correction section 301, a shift memory 302, a LOG conversion section 303, a black generating section 304, a masking UCR section 305, a density conversion section 307, a trimming processing section 308, a variable magnification displacement processing section 309, and a color determination section 310.

The above-mentioned construction together with the operation will next be described in detail. An output signal from the CCD 76 is subjected to the shading correction for each color by the shading correction section 301, and is corrected for differences between colors and between pixels, and input to the color determination section 310 and to the LOG conversion section 303 that performs a logarithmic correction for optical density conversion. Density signals Y (yellow), M (magenta), C (cyan) output from the the LOG conversion section 303 are input to the black generating section 304, where a black signal (BK) is generated based on the input density signals.

In the masking UCR section 305, corrections for the filter characteristics and the toner density characteristics are carried out on the Y, M, C, BK signals output from the black generating section 304, and then, one color signal that is to be developed is selected out of the four color signals. The density conversion section 307 performs a density conversion on the selected signal in accordance with the development characteristics of the printer and/or the user's taste, and the trimming section 308 performs an editing process on a section or sections of the image desired by the user, whereby an image signal is output to the image forming section 102.

The signal from the shift memory 302 is also input to the color determination section 310. In the color determination section 310, it is determined whether the original P is achromatic or chromatic so that a chromatic color exceeding a predetermined level is detected. The original P is determined to be achromatic color when the R, G, B signals are in the same proportion. Thus, when the difference between R, G, and B signals is small, the color is determined to be achromatic. More specifically, the difference between R and G is calculated, the difference between G and B is calculated, and if the obtained differences are sufficiently small, the color is determined to be achromatic.

Figure 1:
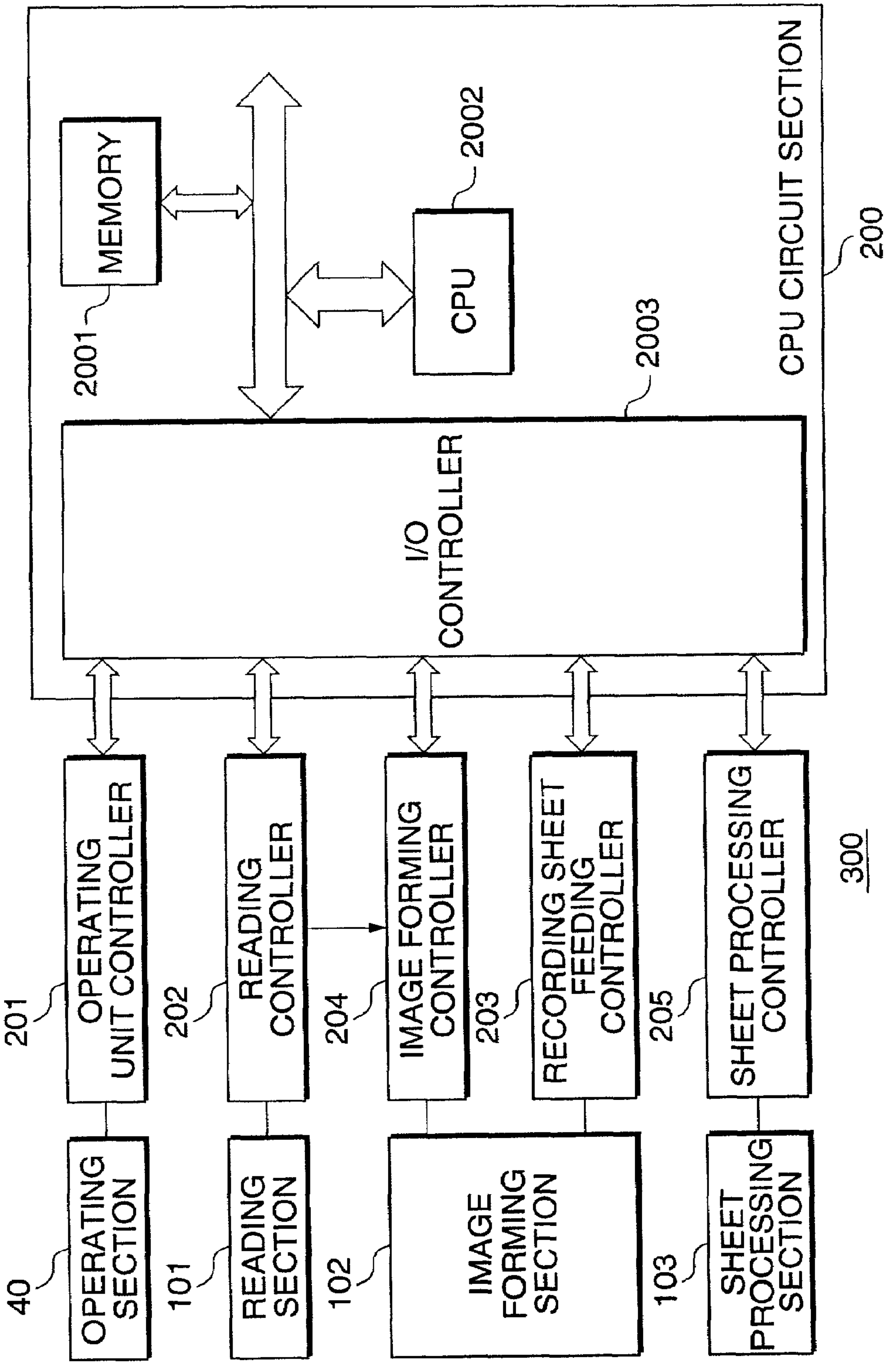
FIG. 1 is a block diagram showing the detailed construction of a controller of a copying apparatus as an image forming apparatus according to a first embodiment of the present invention.

FIG. 1 is a block diagram showing the detailed construction of a controller 300 that controls the copying apparatus 1000 according to the first embodiment. The controller 300 is comprised of a CPU circuit section 200, an operating section controller 201, a reading controller 202, a recording sheet-feeding controller 203, an image forming controller 204, and a sheet processing controller 205.

The above-mentioned construction will now be described in detail. The CPU circuit section 200 performs processing in accordance with a predetermined program, and is comprised of a central processing unit (hereinafter referred to as the CPU) 2002, and a memory 2001 such as a read only memory (ROM) storing programs and predetermined data, a random access memory (RAM) for temporarily storing data as required by signal processing, and an IC card or a floppy disk for writing or reading programs and data, and an I/O controller 2003 for transmitting and controlling signals. The CPU 2002 performs processes as shown by flow charts, described later, based on a program according to the present invention, described later. The memory 2001 and the I/O controller 2003 are controlled by control signals from the CPU 2002. The CPU circuit section 200 also controls the operating section controller 201, the reading controller 202, the recording sheet feeding controller 203, the image forming controller 204, and the sheet processing controller 205.

The operating section controller 201 performs various settings input from the operating section 40, and controls display at the operating section 40 as well as lamp turning on/off at the operating section 40, etc. The reading controller 202 controls the reading section 101. The recording sheet feeding controller 203 controls the image forming section 102 to perform feeding of recording sheets. The image forming controller 204 control the image forming section 102 to perform image formation. The sheet processing controller 205 controls the sheet processing section 103 to perform sheet processing.

Figure 4:
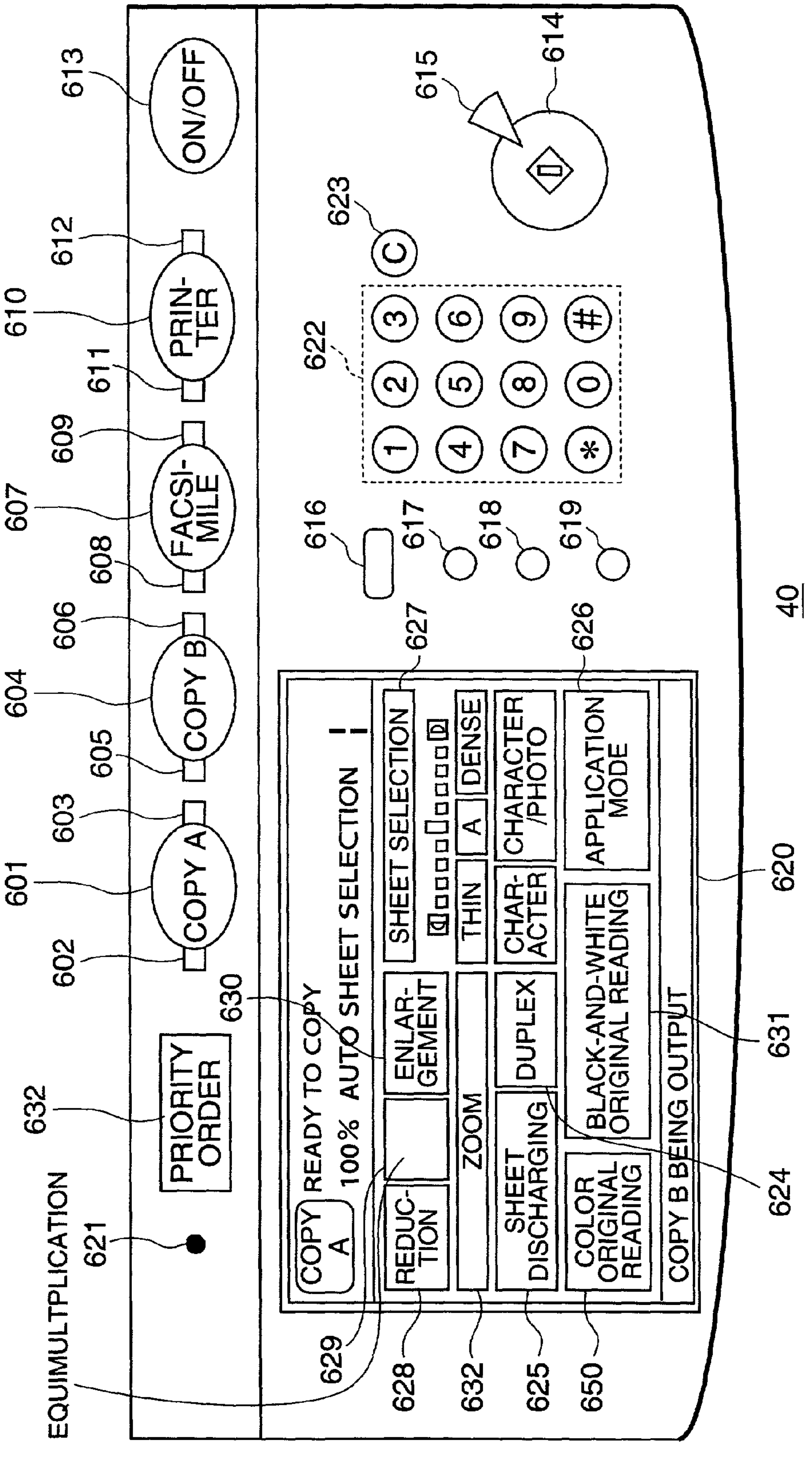
FIG. 4 is a view showing the construction of an operating section of the copying apparatus according to the first embodiment.

Next, the operating section 40 of the copying apparatus 1000 will be described. FIG. 4 is a view showing the surface layout of the operating section 40 of the copying apparatus 1000. A power lamp 621 is provided for indicating that power supply is turned on. A power switch 613 is turned on and off in response to on and off of the power supply. A ten key 622 is used for numerical input for setting the number of image formed sheets, setting operating modes, etc. The ten key 622 is also used for entering telephone numbers in a screen view for facsimile setting. A clear key 623 is used for clearing the settings input by the ten key 622. A reset key 616 is used for initializing the set number of image formed sheets, modes such as operating modes and selected sheet feeding trays, etc. to default or initially set values.

A start key 614 causes start of the image forming operation when depressed. The start key 614 is provided at its center with red and green LEDs (not shown) to indicate whether the image forming operation can be started or not. If the image forming operation cannot be started, the red LED is turned on, and if the image forming operation can be started, the green LED is turned on. A stop key 615 is used to stop the copying operation. When a guide key 617 is depressed followed by depression of another key, an explanation of a function or functions that can be set by the other key is displayed on a display panel 620. To cancel this guide display, it suffices to depress the guide key 617 again. A user setting key 618 is used by the user for changing settings of the copying apparatus 1000. The settings that can be changed by the user using the key 618 are, for example, time before the settings of the copying apparatus 1000 are automatically cleared, and setting of the default values of the modes when the reset key 616 is depressed. An interrupt key 619, when depressed during an image forming operation, causes another image forming operation to be interrupted.

The display panel 620 is formed of a liquid crystal display or the like, and has display contents thereof switched as the mode is changed to facilitate detailed mode setting. The display panel 620 has a screen formed of a touch panel so that functions can be selected and executed by touching the insides of frames of respective displayed functions. In the example shown in FIG. 4, a view for setting a copying operating mode is displayed on the display panel 620. Keys 624, 625, 626, 627, 628, 629, 630, 631, and 632 are displayed on the display panel 620. The user can set operating modes of the copying apparatus 1000 by depressing these keys.

The key 627 is used for selecting types of sheets, and the keys 628, 629, 630, 632 are used for setting copying magnifications of the copying operation. The application mode key 626 is used for setting various application function modes such as a multiple operating mode, a reduced-size layout mode, a cover sheet mode, and an interleaved sheet mode. Upon depression of the application mode key 626, a view for setting various application function modes is displayed on the display panel 620. A user sets an application function mode on the displayed view. A duplex operation setting key 624 is used for setting a duplex operation. More specifically, the key 624 sets duplex copying modes, such as "single-double mode" in which a double-sided original is output from two single-sided originals, "double-double mode" in which a double-sided original is output from a double-sided original, and "double-single mode" in which two single-sided originals are output from a double-sided original.

A sheet discharging operation key 625 is used for setting an operating mode of the finisher 103, setting a recording sheet sorting mode using an image memory, and setting an insert mode for performing an insert operation. A color original reading key 630 is used for setting an original reading mode, that is, a mode in which only color originals are extracted from a plurality of originals P stacked on the original stacking tray 50 and processed. A black-and-white original reading key 631 is used for setting a mode in which only black-and-white originals are extracted from a plurality of originals P and processed.

When either the color original reading key 630 or the black-and-white original reading key 631 is depressed, the key indicating the selected mode is displayed in a black-and-white reversed manner so that the currently set original reading mode can be recognized at once. When the key displayed in the reversed manner is depressed, the corresponding mode is canceled and the key returns to a non-reversed display (normal display). In the initial state, both the color original reading key 630 and the black-and-white original reading key 631 are in the non-reversed display. On this occasion, an ordinary reading mode is set so that all the plurality of originals set on the original stacking tray 50 are processed irrespective of color originals or black-and-white originals.

Among the keys displayed on the display panel 620, those which cannot be used are displayed in dotted lines (hatched) to indicate the non-operable state of the keys. At a top position in the display panel 620, contents of the set copying operation or the current operative state are displayed to the extent that can be displayed in one line. In FIG. 4, a setting screen view of copy A is shown. At a bottom position in the display panel 620, the operative state of another function mode is displayed to the extent that can be displayed in one line. In FIG. 4, it is indicated that copy B is being output to the printer section.

A copy A function key 601, a copy B function key 604, a facsimile function key 607, and a printer function key 610 in FIG. 4 are function keys used for switching the displayed contents of the display panel 620 of the operating section 40 in order to set various functions for copying operation and system operation. These function keys are constructed in the form of semi-transparent buttons with indicator lamps (not shown) such as LEDs inside the keys. Only the lamp inside the key corresponding to the selected operating view is turned on.

Green LEDs 603, 606, 609, and 612 provided on the right side of the function keys 601, 604, 607, and 610 are controlled to be turned on so as to indicate the operative states of respective functions. For example, when the copy B function key 604 is depressed, the operating view for copy B is displayed on the display panel 620. The LED 606 for copy B is controlled to remain off while copy B is on standby. When copy B is being output as in FIG. 4, the LED 606 for copy B is controlled to blink. When the image of copy B is stored in the memory 2001 and printing of copy B is not being performed, the LED 606 for copy B is controlled to remain on.

Red LEDs 602, 605, 608, and 611 provided on the right side of the function keys 601, 604, 607, and 610 are controlled to be turned on so as to indicate occurrence of abnormal events in respective functions. For example, when an abnormal event such as interruption of the operation due to exhaustion of sheets or occurrence of a jam in copy B, the LED 605 is controlled to blink. In this state, if the copy B function key 604 is depressed to switch to the copy B function, the abnormal condition of copy B is displayed on the display panel 620 and details of the abnormal event can be recognized.

The above-mentioned function keys 601, 604, 607, and 610 can be depressed in any operative state to change the contents displayed on the display panel 620 to switch the operating section. The above-mentioned stop key 615, start key 614, reset key 616, etc. that are not found in the display panel 620 can perform respective operations corresponding to functions selected from the copy A function key 601, the copy B function key 604, the facsimile function key 607 and the printer key 610.

As shown in FIG. 4, for example, to stop the copying operation of the copy B while the operating view is displayed on the display panel 620, the copy B function key 604 is depressed to change the operating view, and then the stop key 615 is depressed to stop the copying operation of copy B. The contents of change made by the user setting key 618 are reflected upon the function selected at the time of change and therefore setting of the image forming apparatus can be set independently for each function.

Figure 5:
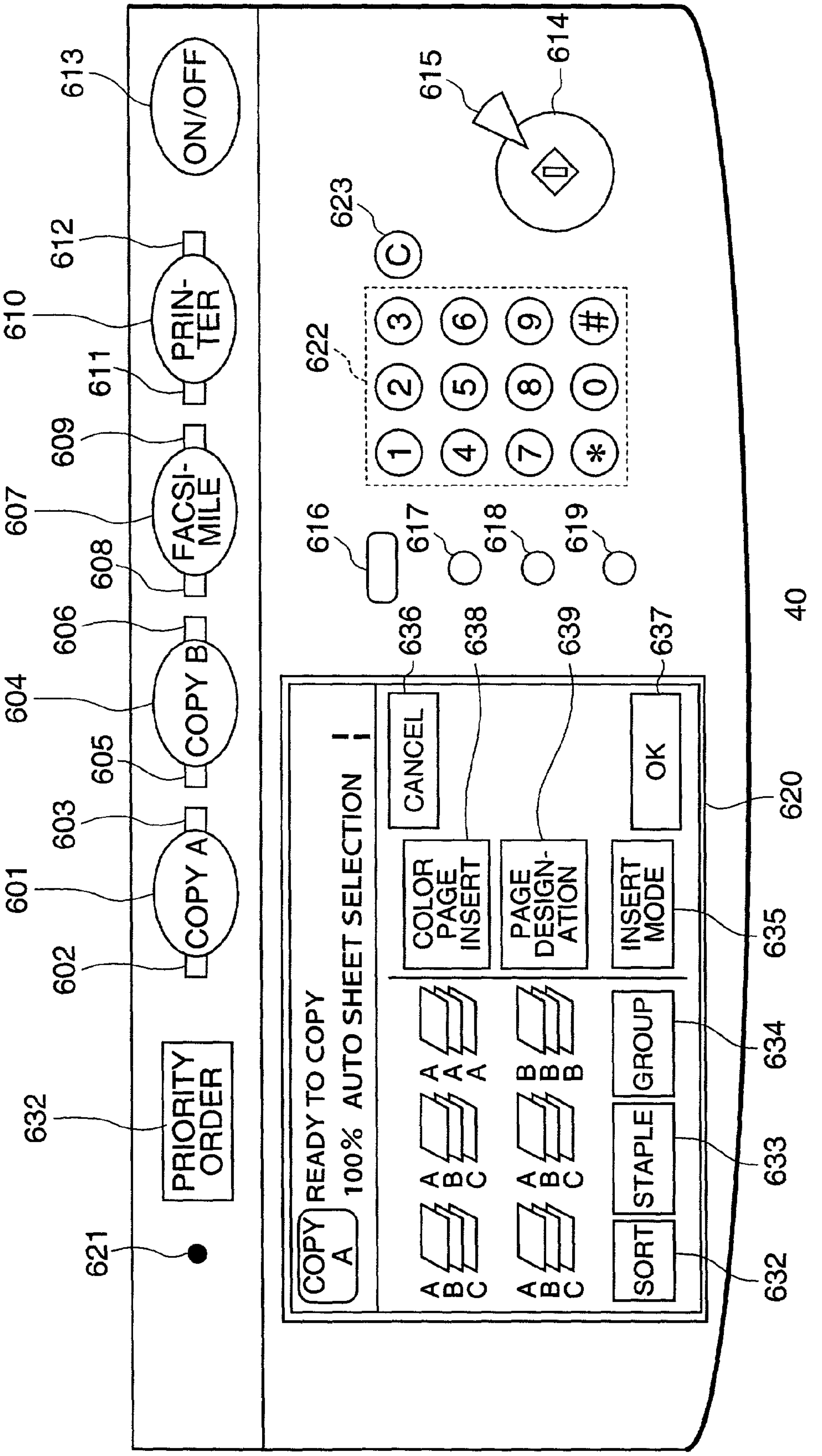
FIG. 5 is a view showing the surface layout of the operating section of the copying apparatus according to the first embodiment.

FIG. 5 is a view showing a sheet discharging process setting view that is displayed on the display panel 620 when the sheet discharging process key 625 is depressed. A sheet discharging mode is selected on this setting view. A sort key 632 is used for setting a sheet discharging process in a sort mode, a staple key 633 is used for setting a staple processing mode for the sorted recording sheet, and a group key 634 is used for setting a group mode in which copy of an original is discharged to one bin. An insert mode key 635 is used for setting an insert mode in which the inserter 104 is used to perform insert processing.

Figure 6:
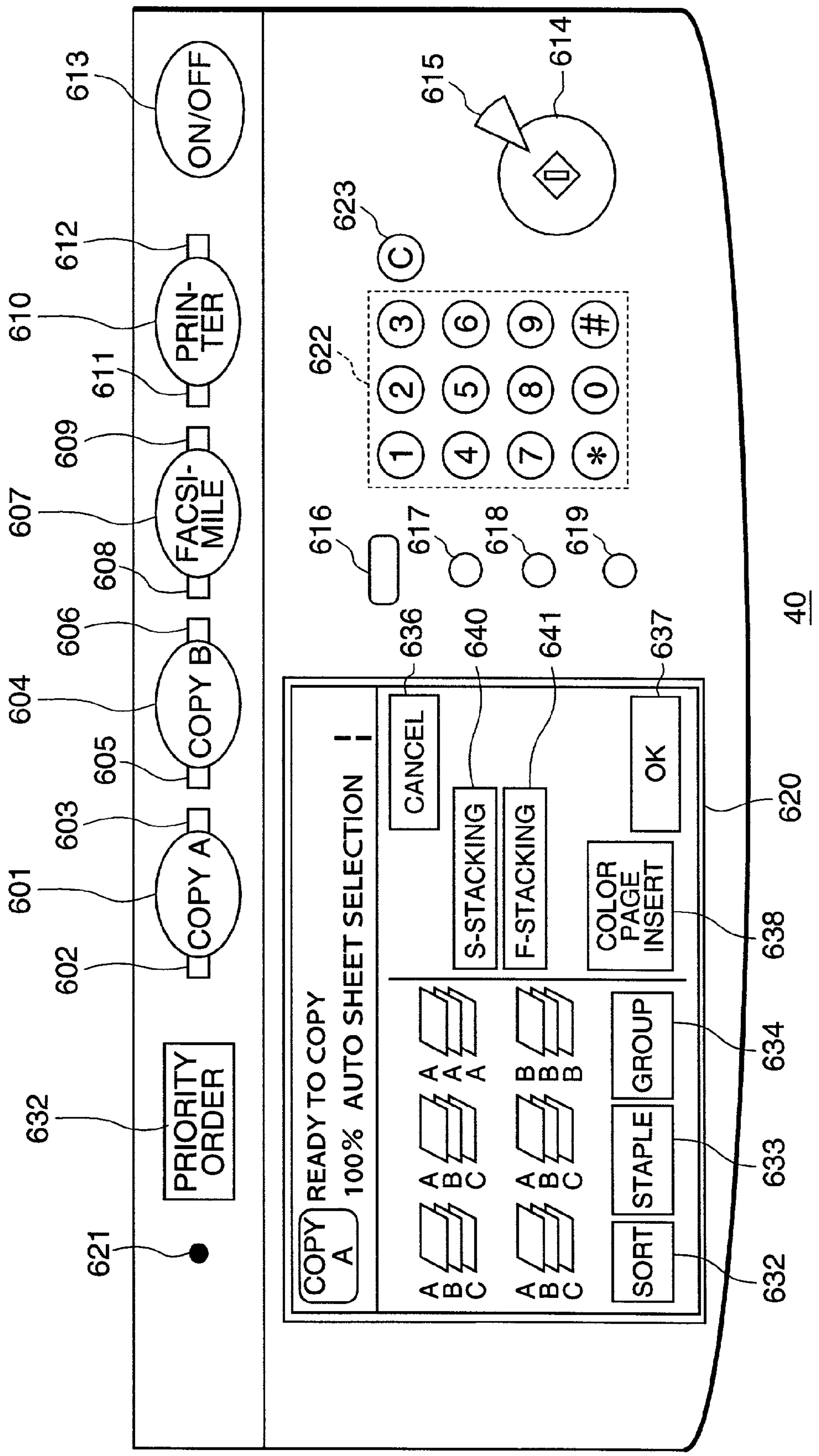
FIG. 6 is a view showing the surface layout of the operating section of the copying apparatus according to the first embodiment.

In the initial state, a color page insert key 638 and a page designating key 639 are displayed in hatched display and cannot be selected. Only when the insert mode key 635 is selected, the hatching is released from the display so that it becomes possible to select these keys. If, at this point, the color page insert key 638 is depressed and selected, the display panel 620 changes to a screen view as shown in FIG. 6, where an S-stacking mode 640 and an F-stacking mode 641 can be selected. The S-stacking mode and F-stacking mode will be described later. These keys for setting the sheet discharging mode are exclusive, and the sheet discharging mode can be selected from either mode. A cancel key 636 is used for canceling the set sheet discharging mode. An OK key 637 is used for confirming the setting of sheet discharging mode selected on the screen view.

Figure 7A:
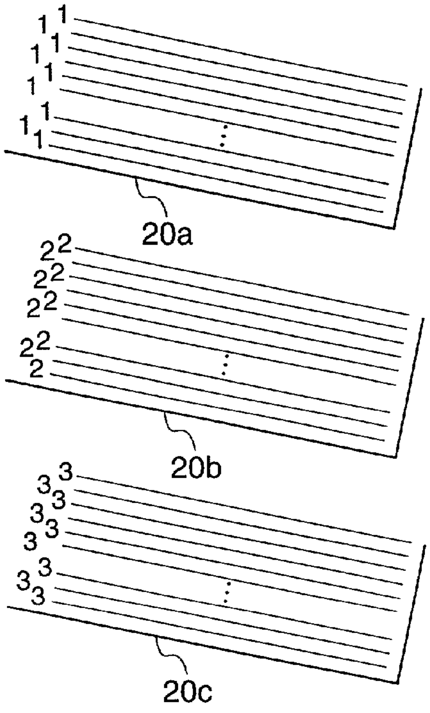
FIG. 7A is a view useful in explaining an example of S-stacking mode which can be selected by the operating section of the copying apparatus according to the first embodiment.
Figure 7B:
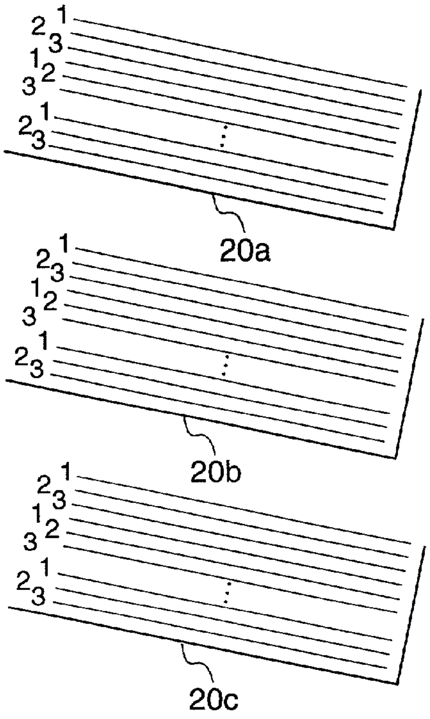
FIG. 7B is a view useful in explaining an example of F-stacking mode which can be selected by the operating section of the copying apparatus according to the first embodiment.

FIGS. 7A and 7B are views useful in explaining the above-mentioned S-stacking mode and F-stacking mode that can be selected by the operating section. When the number of pages to be inserted is three, for example, the S-stacking mode is defined as a mode in which, as shown in FIG. 7A, the same type (the same page) of insert sheets are stacked on each inserter tray and different kinds (different pages) of sheets are stacked on different inserter trays. The F-stacking mode is defined as a mode in which, as shown in FIG. 7B, a bundle of sheets are stacked in the order of page number on each inserter tray. Thus, insert sheets can be stacked on inserter trays in two different ways.

Figure 31:
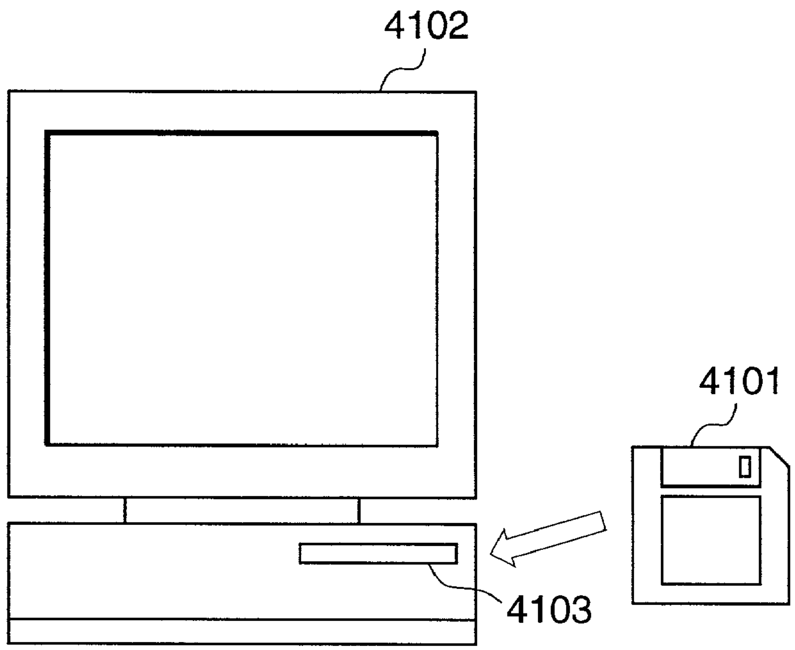
FIG. 31 is a view useful in explaining a manner of supplying the program according to the present invention and related data supplied from the storage medium to an apparatus.

FIG. 31 is a view useful in explaining a manner of supplying the program according to the present invention and related data supplied from the storage medium to an apparatus. The program of the present invention and related data are supplied to an apparatus 4102 such as a computer in the form of a storage medium 4101 such as a floppy disk or a CD-ROM that is inserted into a storage medium drive port 4103 provided in the apparatus 4102. The program of the present invention and related data are subsequently installed from the storage medium 4101 into a hard disk, and then from the hard disk to a RAM, or alternatively without installing into a hard disk, are directly loaded into a RAM, so that the program of the present invention and related data are ready to be executed.

Where the program of the present invention is to be executed in the copying apparatus according to the first to fourth embodiments of the present invention, the program of the present invention and related data may be supplied via the apparatus such as a computer as shown in FIG. 31 to the copying apparatus 1000, or the program of the present invention and related data may be in advance stored in the copying apparatus 1000, so that the program is ready to be executed.

Figure 30:
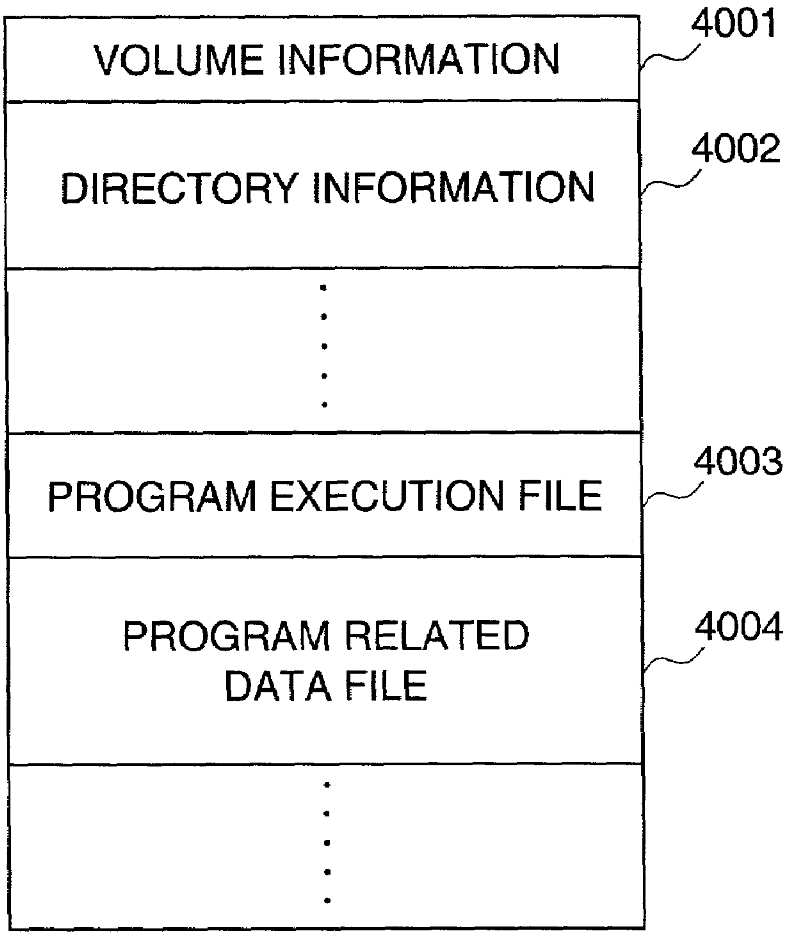
FIG. 30 is a view useful in explaining an example of the construction of the contents of a storage medium storing a program and related data according to the present invention.

FIG. 30 is a view useful in explaining an example of the structure of contents in the storage medium that stores the program of the present invention and related data. The contents stored in the storage medium of the present invention are composed of volume information 4001, directory information 4002, a program execution file 4003, a program related data file 4004, and others. The program of the present invention has been encoded based on flow charts, described hereinbelow.

Next, the operation of the copying apparatus according to the first embodiment will be described with reference to FIGS. 8 to 13.

<Inserter Operation Control>

Figure 8:
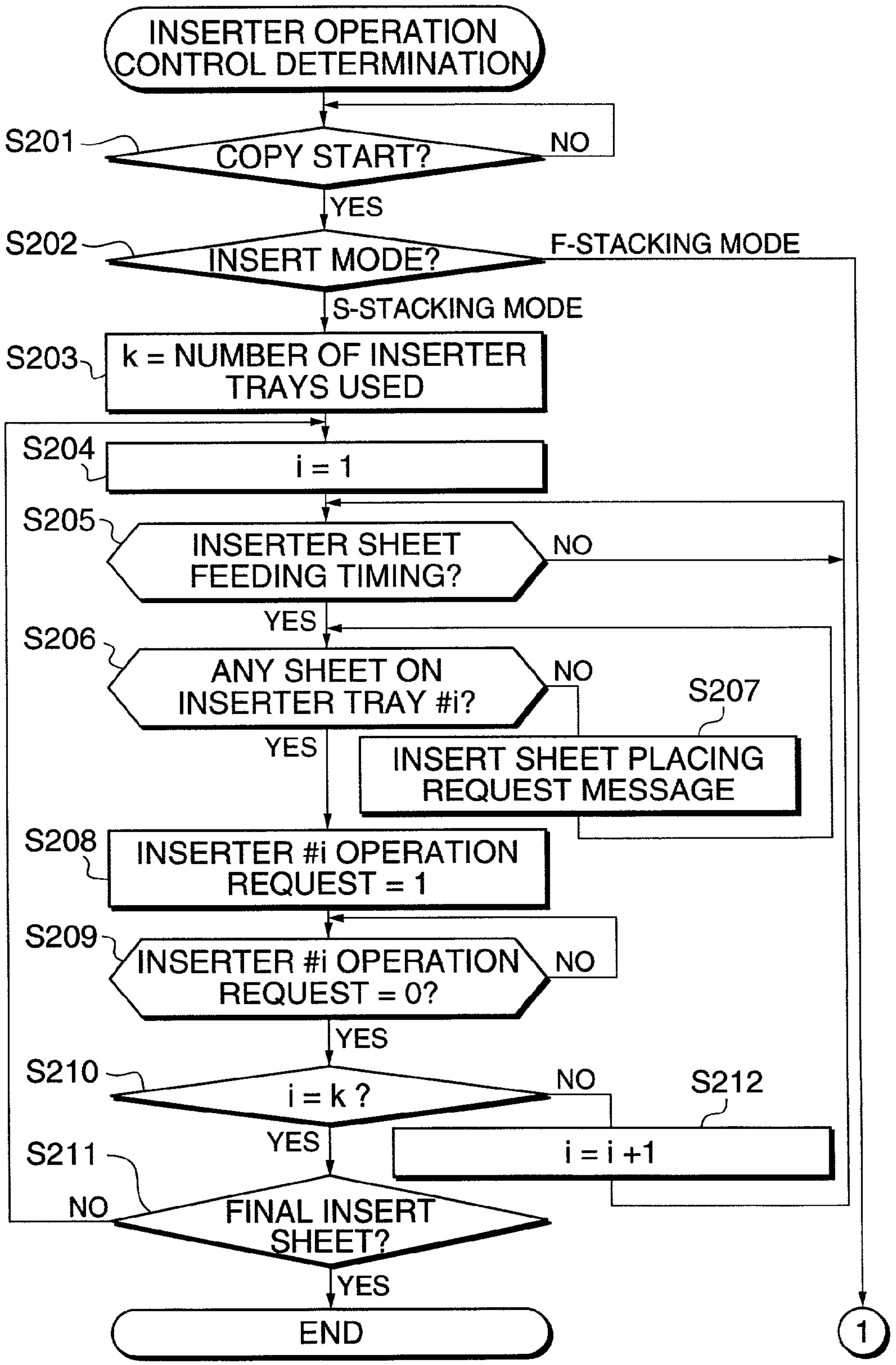
FIG. 8 is a flow chart showing an inserter operation control determining process according to the first embodiment.
Figure 9:
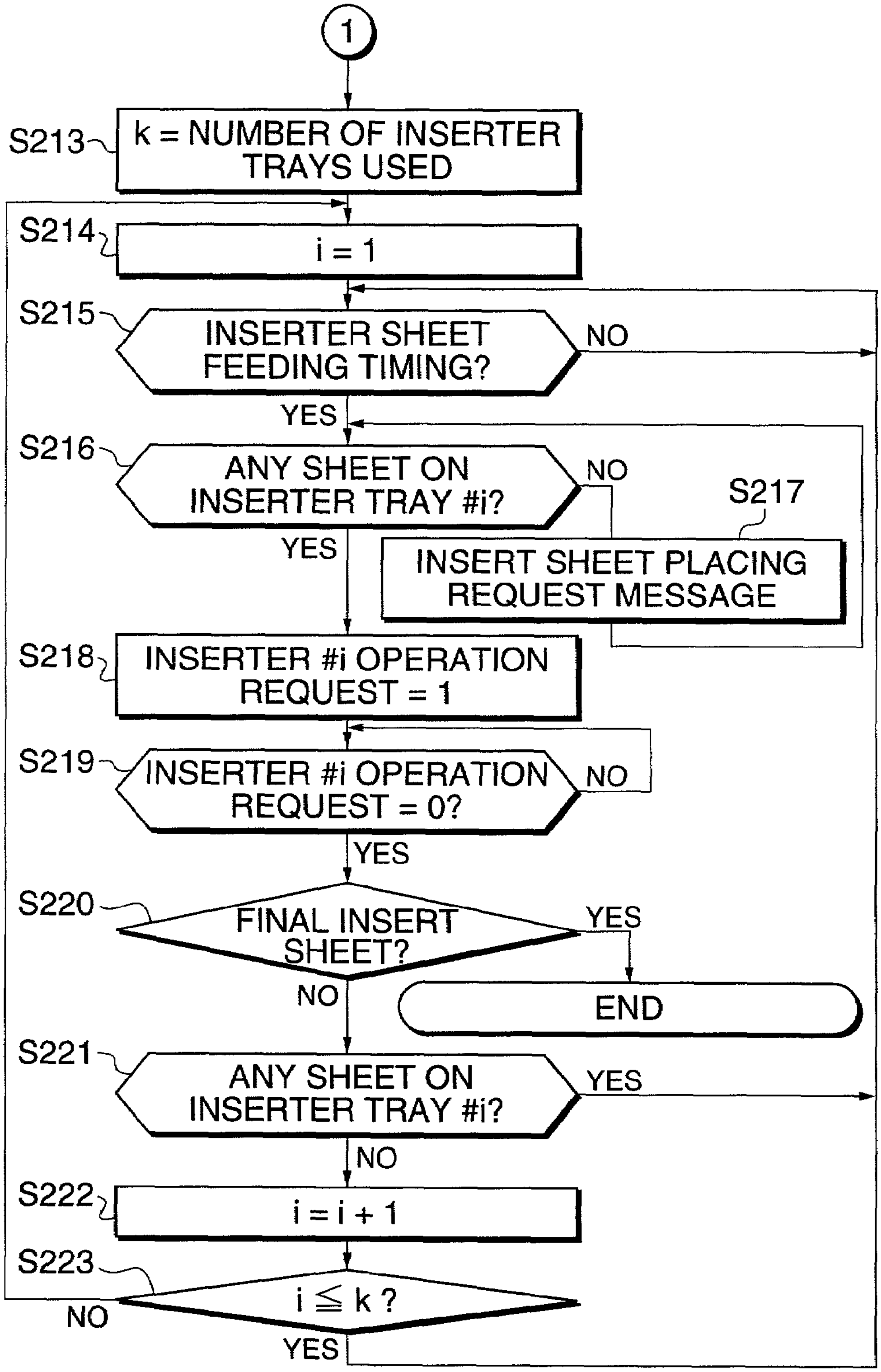
FIG. 9 is a flow chart showing an inserter operation control determining process according to the first embodiment.

A procedure of inserter operation control for controlling the inserter operation when the insert mode for inserting insert sheets is selected as the copying mode, will first be described with reference to FIGS. 8 and 9. In the first embodiment, it is assumed that three inserter trays are used, and three pages of insert sheets are to be inserted. When copy start is instructed by the operating section 40 (step S201), it is determined what stacking mode is used in which the insert sheets are stacked on the inserter trays, that is, whether the stacking mode is S-stacking mode or F-stacking mode (step S202). As described later, this is determined based on a signal input from the operating section 40.

If the stacking mode of the inserter tray is determined to be the S-stacking mode, the number of pages of insert sheets to be inserted (the number of inserter trays to be used), that is, the number 3 is set to a variable k (step S203). Next, the number of an inserter tray from which an insert sheet is to be fed first, that is, the number 1 is set to a variable i (step S204). Then, it is determined whether it is timing for inserting an insert sheet or not (step S205). The timing for inserting an insert sheet will be described later with reference to FIGS. 12 and 13. The inserter trays #1, #2 and #3 correspond to the inserter trays 20*a* to 20*c*, 20*b* and 20*c*, respectively.

If at this point an inserter sheet feeding timing signal is generated, it is determined that it is the timing for inserting an insert sheet, and then it is determined whether there is an insert sheet on the inserter tray #i or not (step S206). If there is an insert sheet on the inserter tray #i, an inserter tray #i operation request flag is set to 1, that is, a sheet feeding request for an insert sheet from the inserter tray #i is issued to the inserter 104 (step S208). If it is determined at the step S206 that there is no insert sheet on the inserter tray #i, a message is displayed on the display panel 620 to request that insert sheets be placed on the inserter tray #i (step S207), and the process waits for insert sheets to be placed.

In response to the inserter tray #i operation request flag being set to 1, the inserter 104 feeds one insert sheet from the inserter tray #i, and sets the inserter tray #i flag to 0. If after execution of the step S208, it is determined that the inserter tray #i operation request flag has been set to 0 by the inserter 104 (step S209), it is determined whether the variable i is equal to the variable k or not (step S210). If i=k holds, it is determined whether the final insert sheet of the copy job has been fed or not (step S211). If the final insert sheet has not been fed, the process returns to the step S204. If the final insert sheet has been fed, the process of this flow chart is terminated. If i≈k holds in the step S210, the variable i is incremented by one (step S212), and the process returns to the step S205.

If in the step S202, the stacking mode of the inserter tray is determined to be the F-stacking mode, the number of inserter trays (the number of inserter trays) on which insert sheets to be inserted are set is set to the variable k (step S213). Next, the number of an inserter tray from which a sheet is to be fed first, that is, the number 1 is set to the variable i (step S214). Then, it is determined whether it is the timing for inserting an insert sheet or not (step S215). If it is the timing for inserting an insert sheet, it is determined whether there is an insert sheet on the inserter tray #i or not (step S216). If there is a sheet, the inserter tray #i operation request flag is set to 1, that is, a sheet feeding request that the insert sheet be fed from the inserter tray #i is issued to the inserter 104 (step S218). If it is determined at the step S216 that there is no insert sheet on the inserter tray #i, a message is displayed on the display panel 620 requesting that insert sheets be placed on the inserter tray #i (step S217), and the process waits for insert sheets to be placed.

If after execution of the step S218, it is determined that the inserter tray #i operation request flag has been set to 0 by the inserter 104 (step S219), it is determined whether the final insert sheet has been fed or not (step S220). If the final sheet has been fed, the process is terminated. If the final insert sheet has not been fed, it is determined whether there is an insert sheet on the inserter tray #i or not (step S221). If there is an insert sheet, the process returns to the step S215. If there is no insert sheet, the number of an inserter tray from which an insert sheet is to be fed is changed (step S222), and the variable k is compared with the variable i (step S223). If the variable i is equal to or less than the variable k, the process returns to the step S214. If at the step S223, the variable i is greater than the variable k, the process returns to the step S215, to set the variable i to 1.

Thus, if all the insert sheets stacked on the inserter tray #i have been fed, insert sheets are successively fed from an inserter tray #i+1. Therefore, when the F-stacking mode is set, the operation can be continuously run without interruption of the job due to supply of insert sheets by the user to the inserter tray emptied of insert sheets. The operation shown in FIGS. 8 and 9 is controlled by the CPU 2002.

<Sheet Feeding from the Inserter>

Figure 10:
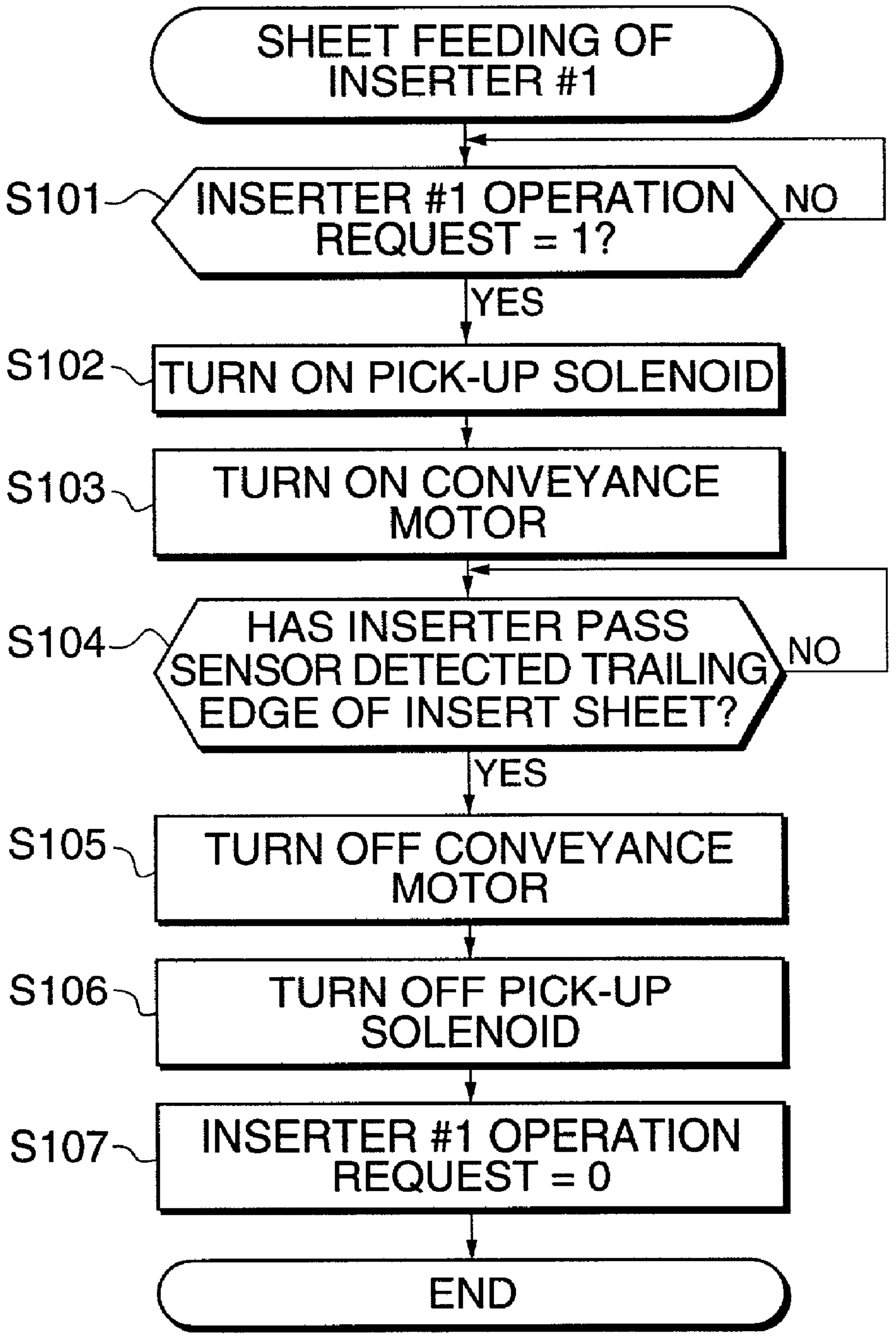
FIG. 10 is a flow chart showing a sheet feeding process executed by an inserter 1 according to the first embodiment.

A procedure of control of sheet feeding from the inserter will next be described with reference to FIG. 10. The case where sheets are fed from the inserter tray 20*a* will be described. When the inserter tray #1 operation request flag is set to 1 by the CPU 2002 (step S101), a sheet feeding solenoid (not shown) for conveying insert sheets stacked on the inserter tray 20*a* is turned on to cause the sheet feeding roller 21*a* to be seated onto the insert sheets IS (step S102). Then, in order to convey the insert sheets, a conveyance motor (not shown) for driving the sheet feeding roller 21*a* is turned on (step S103).

Next, when the inserter pass sensor 41 provided on the conveyance path for the insert sheets detects the passage of the trailing edge of each insert sheet (step S104), the conveyance motor is turned off (step S105). Next, by turning off the sheet feeding solenoid, the sheet feeding roller 20*a* is retracted to a position separated from the insert sheets IS. When a series of sheet feeding operations of the inserter 104 are completed, the inserter tray #1 operation request flag is set to 0 (step S107), and the sheet feeding flow of the inserter 104 is terminated.

The above described operation of the inserter 104 refers to the case where insert sheets are fed from the inserter tray 20*a*. Where insert sheets are fed from the inserter tray 20*b* or 20*c*, the operation of the inserter 104 carried out upon the operation request is the same as described above. The operation shown in FIG. 10 is controlled by the CPU 205.

<Insert Mode Determination>

Figure 11:
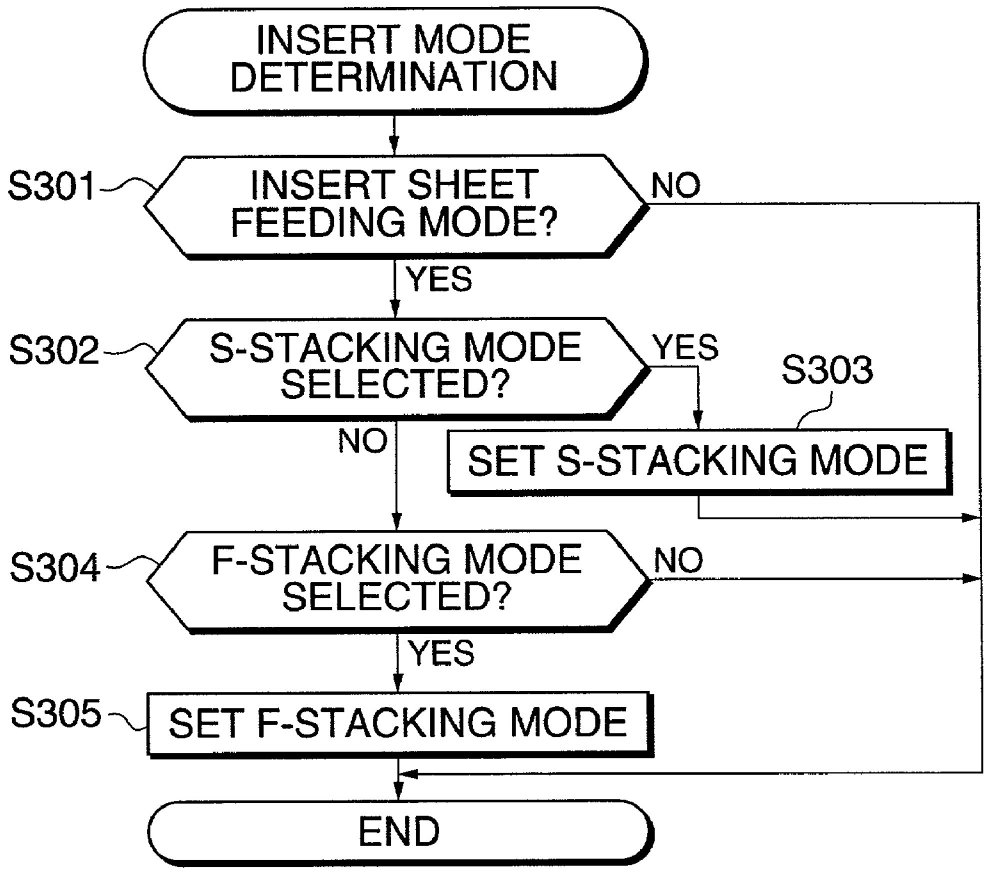
FIG. 11 is a flow chart showing an insert mode determining process according to the first embodiment.

A procedure of insert mode determination will be described with reference to FIG. 11. First, it is determined whether the insert mode has been selected by the operating section or not (step S301). If the insert mode has been selected, it is determined whether the S-stacking mode has been selected as the method of stacking sheets onto the inserter tray or not (step S302). If the S-stacking mode has been selected, the S-stacking mode is set as the insert mode (step S303). If at the step S302 it is determined that the S-stacking mode has not been selected, it is determined whether the F-stacking mode has been selected or not (step S304). If the F-stacking mode has been selected, the F-stacking mode is set as the insert mode (step S305). The operation shown in FIG. 11 is controlled by the CPU 2002.

<Inserter Sheet Feeding Timing>

Figure 12:
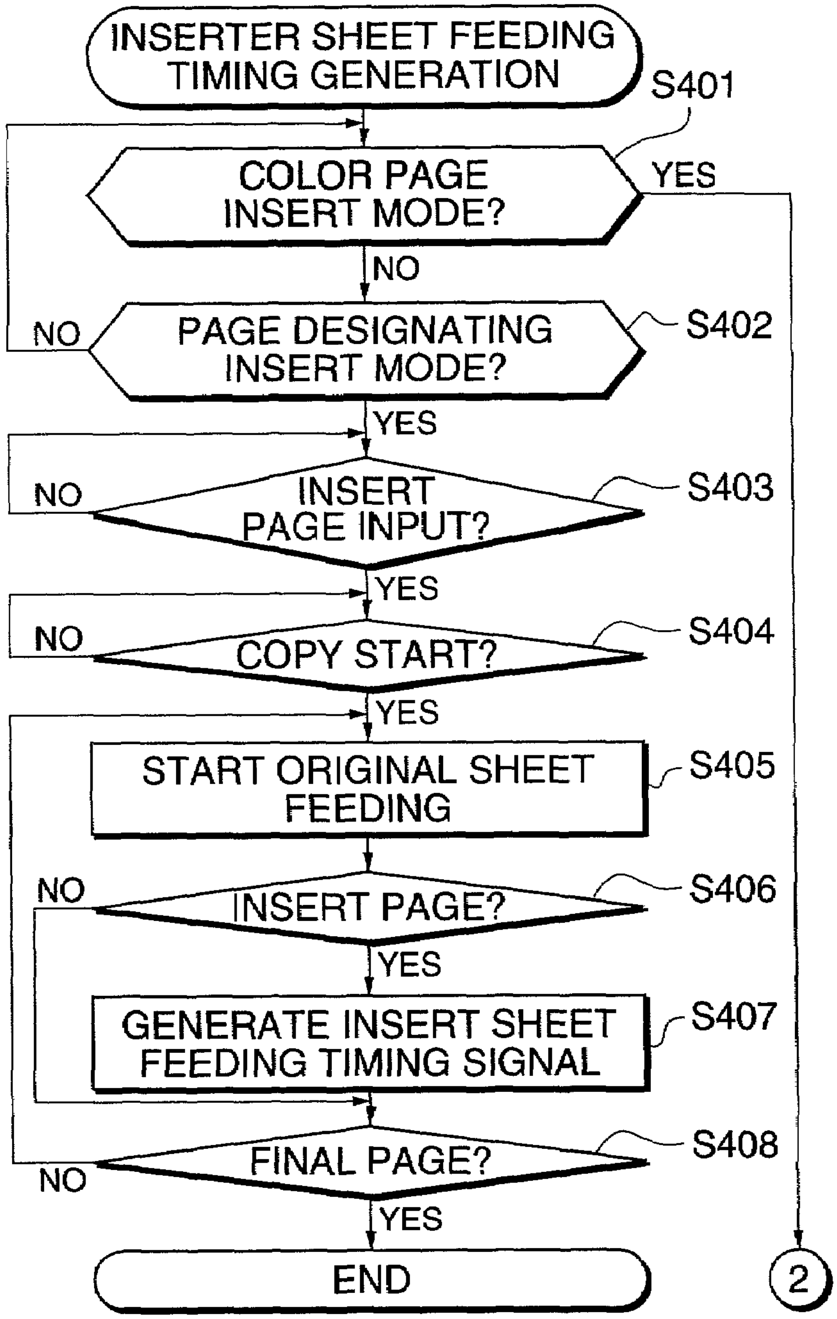
FIG. 12 is a flow chart showing an inserter sheet feeding timing generation process according to the first embodiment.
Figure 13:
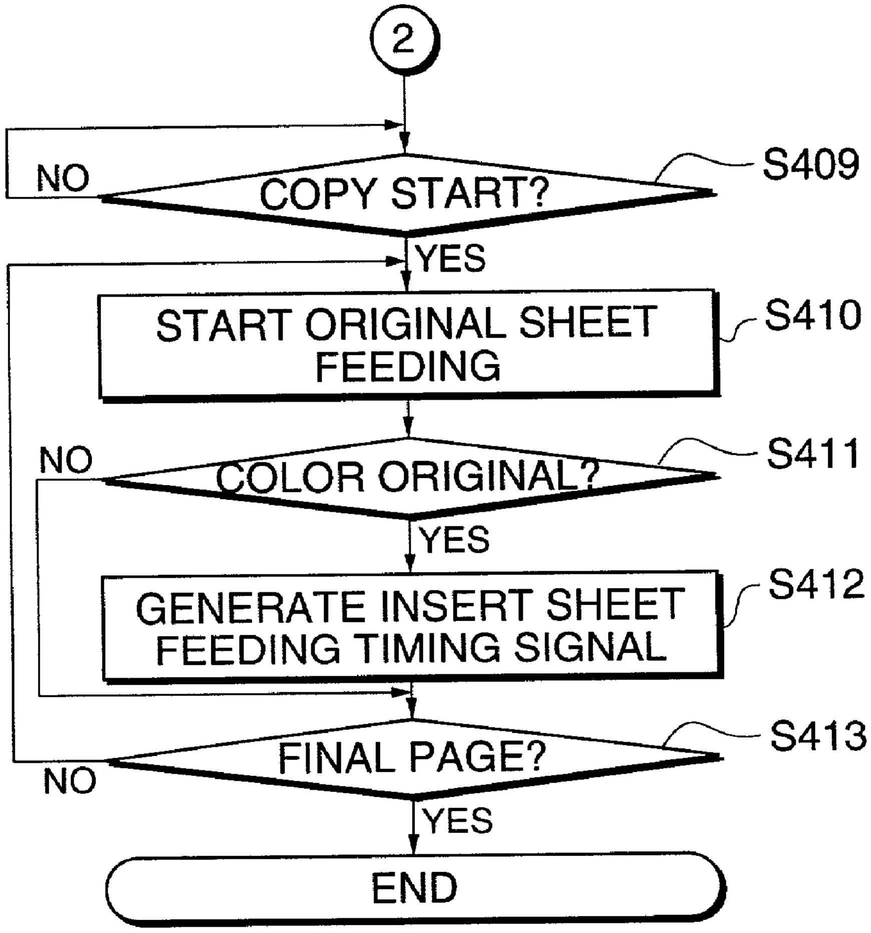
FIG. 13 is a flow chart showing a continued part of the inserter sheet feeding timing generation process according to the first embodiment.
Figure 14:
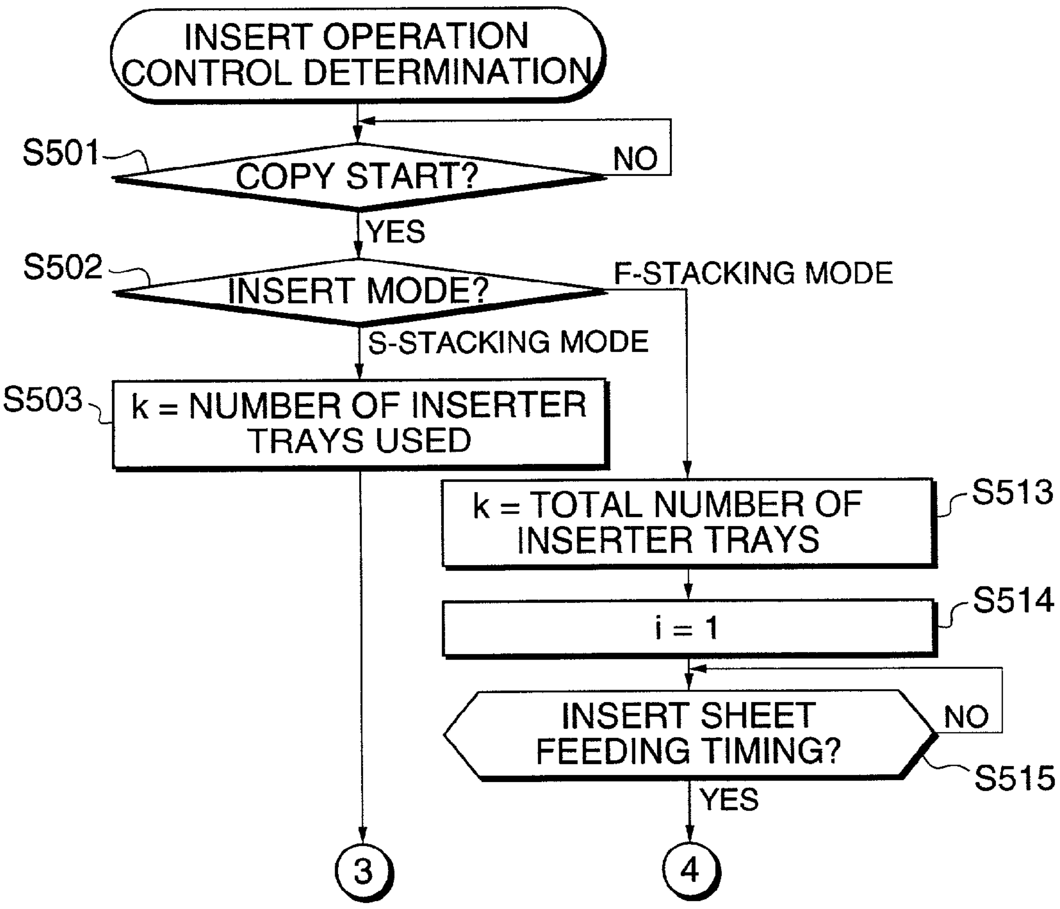
FIG. 14 is a flow chart showing an inserter operation control determining process according to a second embodiment of the present invention.
Figure 15:
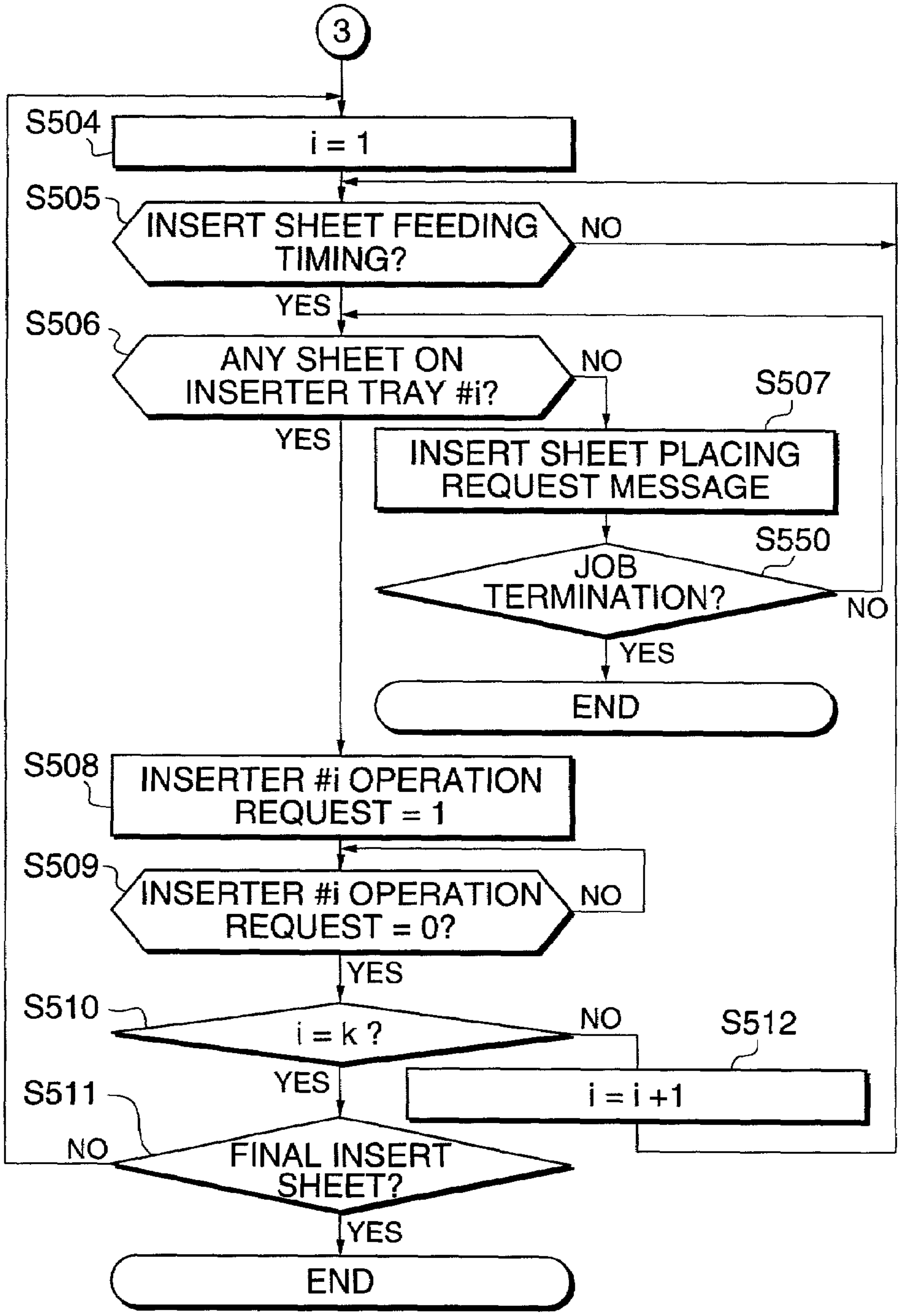
FIG. 15 is a flow chart showing a continued part of the inserter operation control determining process according to the second embodiment.
Figure 16:
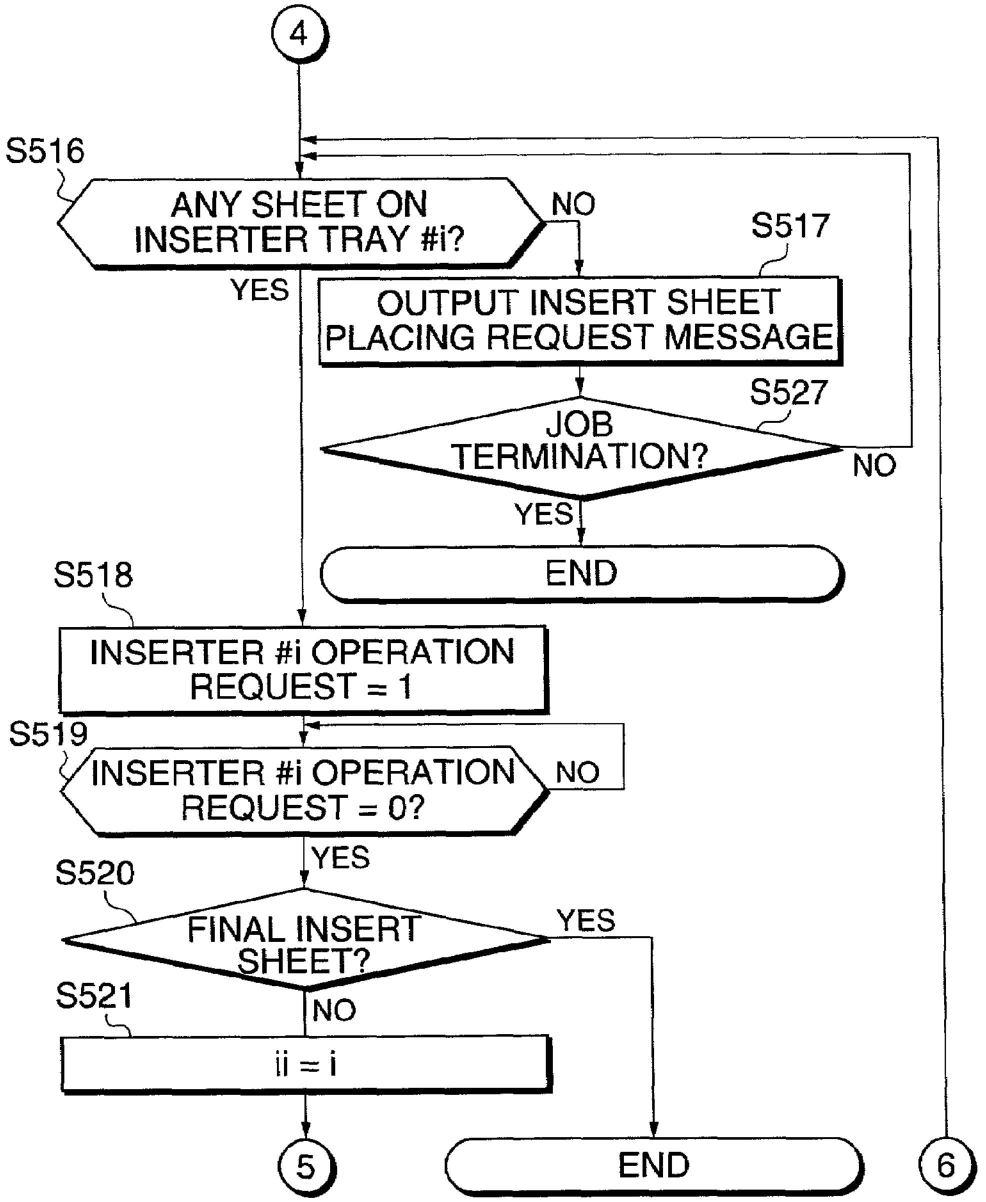
FIG. 16 is a flow chart showing a continued part of the inserter operation control determining process according to the second embodiment.
Figure 17:
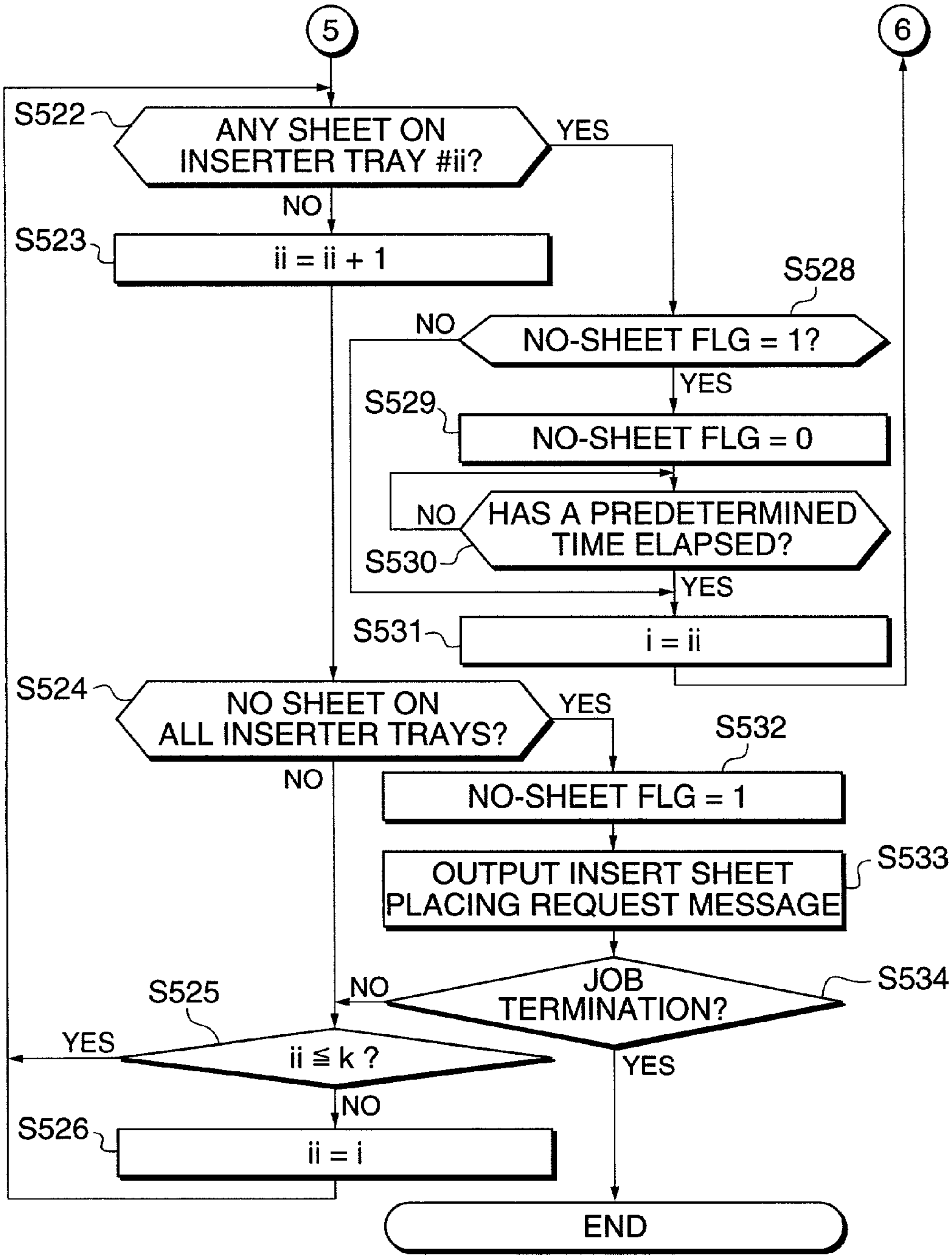
FIG. 17 is a flow chart showing a continued part of the inserter operation control determining process according to the second embodiment.

A procedure of generation of the inserter sheet feeding timing when the insert mode is selected will be described with reference to FIGS. 12 and 13. First, it is determined whether the color page insert key 638 has been selected by the operating section 40 or not (step S401). If the color page insert key 638 has been selected, the process waits for the copy start key 614 to be selected (step S409). When it is determined at step S409 that the copy start key 614 is selected, feeding of an original is started (step S410). Next, the original is read, and it is determined whether the original is a color original or not (step S411). If the original is determined to be a color original, the inserter sheet feeding timing signal is generated. Then, it is determined whether the original is the final page of the job or not (step S413). If it is the final page, the process is terminated, and if it is not the final page, the process returns to the step S410.

Figure 7C:
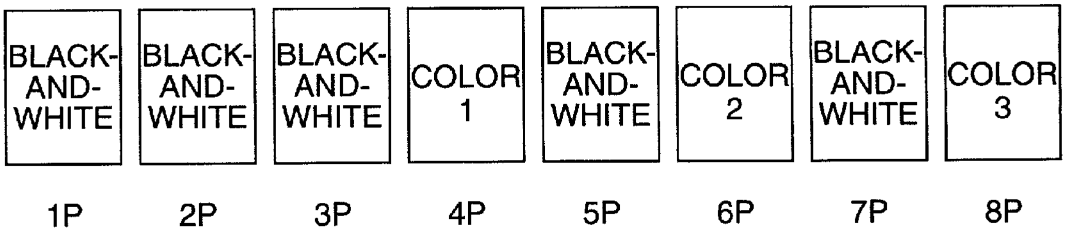
FIG. 7C is a view useful in explaining an example of plural-original stacking which can be selected by the operating section of the copying apparatus according to the first embodiment.

If it is determined at step S401 that the color page insert key has not been selected, it is determined whether a page designating insert mode has been selected or not (step S402). If the page designating insert mode has been selected, the process waits for the user to input pages to be inserted. If, for example, among 8 pages of originals, three pages, that is, the 4-th, 6-th and 8-th pages are to be inserted as in FIG. 7C, the user inputs the three page numbers from the operating section 40.

When the insert page numbers have been input (step S403), it is determined whether the copy start key 614 has been selected or not (step S404). If the copy start key 614 has been selected, feeding of the original is started (step S405). Pages of the originals are counted at the same time, and when the count is equal to one of the page numbers that have been input at step S403 (step S406), the inserter sheet feeding timing signal is generated (step S407). Next, it is determined whether the page is the final page of the originals or not (step S408). If it is the final page, the process is terminated. If it is not the final page, the process returns to the step S405. The operation shown in FIGS. 12 and 13 is controlled by the CPU 2002.

As described above, according to the copying apparatus of the first embodiment, in the case where the F-stacking mode has been selected in which plural types of insert sheets are stacked on the inserter tray, if the inserter tray has been emptied of the stacked insert sheets, insert sheets are again stacked on the inserter tray and the copying apparatus is controlled such that the insert sheets are fed from the inserter tray without interrupting the job being executed. Thus, the present invention has the effect that the insert sheets can be fed in proper order from the inserter tray according to the selected mode of stacking the insert sheets on the inserter tray. If the insert sheets are set on the inserter tray that has been emptied of the insert sheets earlier while insert sheets are being fed from another inserter tray on which other insert sheets are stacked, a sheet feeding operation can be performed from the inserter tray having insert sheets thereon, so that continuous execution of jobs without interruption is possible. This has the effect of reducing the time required for job processing as well as improving the usage environment for the user.

Second Embodiment

An image forming apparatus according to a second embodiment of the present invention has basically the same construction as that according to the first embodiment. The entire construction of the image forming apparatus 1000, and the constructions of the image signal controller 77, the controller 300, and the operating section 40 are identical as those shown in FIGS. 1 to 6.

Next, the operation of the copying apparatus according to the second embodiment will be described with reference to FIGS. 14 to 18.

<Inserter Operation Control>

A procedure of inserter operation control in the case where the insert mode for inserting insert sheets is selected as the copy mode will be described with reference to FIGS. 14 to 17. In the second embodiment, it is assumed that three inserter trays are used, and three pages of insert sheets are to be inserted. When copy start is instructed by the operating section 40 (step S501), it is determined what stacking mode is used to stack insert sheets on the inserter trays, that is, whether the stacking mode is the S-stacking mode or the F-stacking mode (step S502). As described before, this is determined based on the signal input from the operating section 40.

If the stacking mode of the inserter tray is determined to be the S-stacking mode, the number of pages of insert sheets to be inserted (number of inserter trays to be used), that is, the number 3 is set to the variable k (step S503). Next, the number of an inserter tray from which an insert sheet is to be fed first, that is, the number 1 is set to the variable i (step S204). Then, it is determined whether it is timing for inserting an insert sheet or not (step S505). The timing for inserting an insert sheet has been described before with reference to FIGS. 12 and 13.

If at this point, the inserter sheet feeding timing signal is generated, it is determined that it is the timing for inserting an insert sheet, and then it is determined whether there is an insert sheet on the inserter tray #i or not (step S506). If there is an insert sheet on the inserter tray #i, the inserter tray #i operation request flag is set to 1, that is, a sheet feeding request for feeding the insert sheet from the inserter tray #i is issued to the inserter 104 (step S508). If it is determined at step S506 that there is no insert sheet on the inserter tray #i, a message is displayed on the display panel 620 requesting that insert sheets be placed on the inserter tray #i (step S507), and the process waits for insert sheets to be placed. If job termination is instructed while the process is on standby (step S550), the process is terminated.

If after execution of the step S508 it is determined that the inserter tray #i operation request flag has been set to 0 by the inserter 104 (step S509), it is determined whether the variable i is equal to the variable k or not (step S510). If i=k holds, it is determined whether the final insert sheet of the copy job has been fed or not (step S511). If the final insert sheet has not been fed, the process returns to the step S504. If the final insert sheet has been fed, the process of this flow chart is terminated. If i≈k holds in the step S510, the variable i is incremented by 1 (step S512), and the process returns to the step S505.

If it is determined at the step S502 that the stacking mode of the inserter tray is the F-stacking mode, the number of inserter trays on which insert sheets to be inserted are set (the number of inserter trays to be used) is set to k (step S513). Next, the number of an inserter tray from which a sheet is to be fed first, that is, the number 1 is set to the variable i (step S514), and it is determined whether it is timing for inserting an insert sheet or not (step S515). If it is the timing for inserting an insert sheet, it is determined whether there is an insert sheet on the inserter tray #i or not (step S516). If there is a sheet, the inserter tray #i operation request flag is set to 1, that is, a sheet feeding request for feeding the insert sheet from the inserter tray #i is issued to the inserter 104 (step S518). If it is determined at the step S516 that there is no insert sheet on the inserter tray #i, a message is displayed on the display panel 620 requesting that insert sheets be placed on the inserter tray #i (step S517), and the process waits for insert sheets to be placed. If job termination is instructed while the process is on standby (step S527), the process is terminated.

If after execution of the step S518 it is determined that the inserter tray #i operation request flag has been set to 0 by the inserter 104 (step S519), it is determined whether the final insert sheet has been fed or not (step S520). If the final sheet has been fed, the process is terminated. If the final insert sheet has not been fed, the variable i is set to a variable ii (step S521). Then, it is determined whether there is an insert sheet on the inserter tray #ii or not (step S522). If there is an insert sheet, it is determined whether a no-sheet flag is set to 1 or not (step S528). As described later, the no-sheet flag is set to 1 when there is no insert sheet on any of the inserter trays. If it is determined that the no-sheet flag is not set to 1, a step S531 is executed. If it is determined that the no-sheet flag is set to 1, the no-sheet flag is set to 0 (step S529), and the process waits for a predetermined time period to elapse (step S530). After the predetermined time period has elapsed, the variable ii is set to the variable i, that is, an inserter tray from which a sheet is to be fed first is set to the variable ii (step S531). Then, the process returns to the step S516, and the insert sheet is fed from the inserter tray #ii.

If at the step S522 it is determined that there is no insert sheet on the inserter tray #ii, the variable ii is incremented by 1, that is, the inserter tray in which presence of an insert sheet is to be detected is changed (step S523). Next, it is determined whether all the inserter trays have been checked for the presence of insert sheets or not. If all the inserter trays have been checked, the no-sheet flag is set to 1 (step S532), and a message is displayed on the display panel 620 to request that insert sheets be placed on the inserter tray (step S533), and the process waits for insert sheets to be placed. If job termination is instructed while the process is on standby (step S534), the process is terminated.

If it is determined at the step S524 that all the inserter trays have not been checked for the presence of insert sheets, the variable k is compared with the number ii of the inserter tray selected for sheet feeding. If the variable ii is equal to or less than the variable k (step S525), the process returns to the step S522. If it is determined at the step S52 that the variable ii is greater than the variable k, 1 is set to the variable ii (step S526).

Thus, in the case where the F-stacking mode is set, the copying apparatus according to the second embodiment can be continuously run without interrupting the execution of a job being executed by supplying insert sheets to the inserter tray that is emptied of insert sheets. If all the inserter trays have been emptied of insert sheets during the execution of a job, the job can be automatically resumed when it is detected that insert sheets have been placed on any inserter tray again. The operation shown in FIGS. 14 to 17 is controlled by the CPU 2002.

The control of sheet feeding from the inserter 104, insert mode determination control, and inserter sheet feeding timing signal generation control are the same as those in the first embodiment.

<Operation Start Determination Process>

Figure 18:
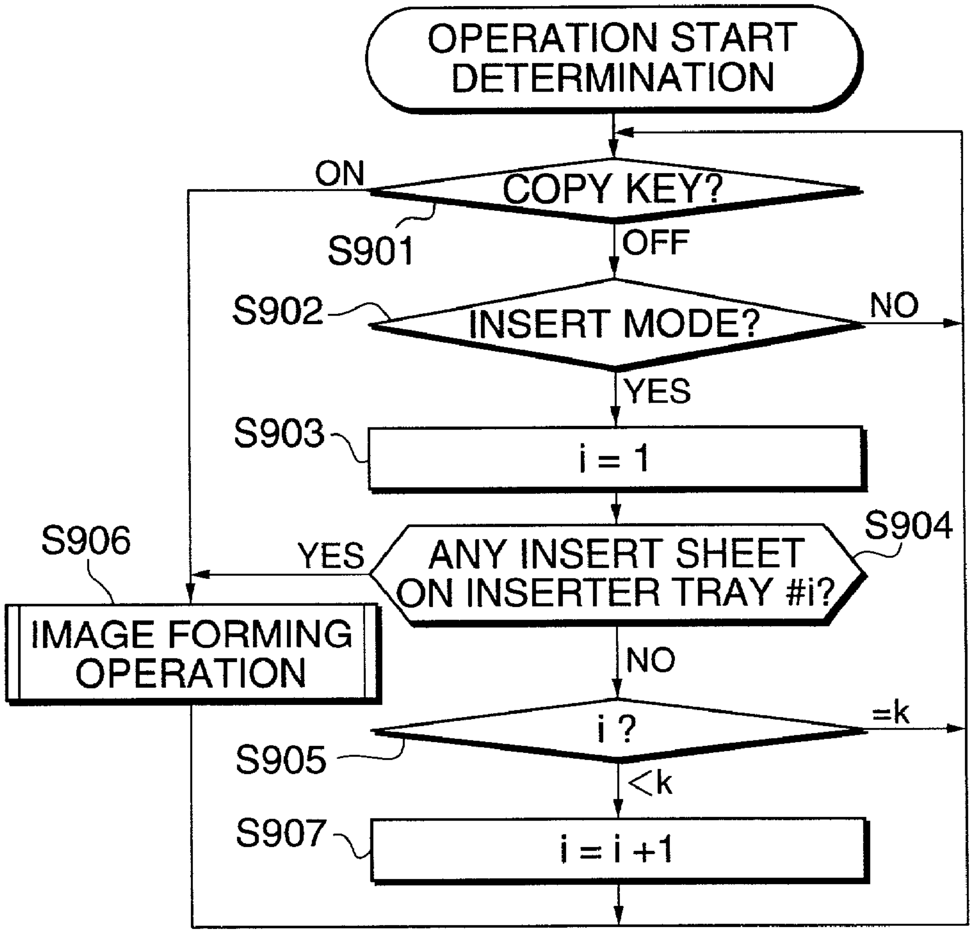
FIG. 18 is a flow chart showing an operation start determining process according to the second embodiment.

Next, an operation start determination process will be described with reference to the flow chart of FIG. 18. This is a process for determining conditions for starting operation of the copying apparatus. First, the status of the copy start key 614 of the operating section 40 is determined (step S901). If the copy start key 614 is on, an image forming operation is started (step S 906). The step S906 is continuously executed until the image forming operation is completed and a series of related group of jobs are processed. Upon completion of the jobs, the process returns to the step S901. If it is determined at the step S901 that the copy start key 614 is not on, it is determined whether the mode selected by the operating section 40 is the insert mode in which insert sheets stacked on the inserter tray are to be inserted into recording sheets or not (step S902), and if it is not the insert mode, the process returns to the step S901.

If it is the insert mode, an initial value of 1 is set to the variable i (step S903). The variable i represents the number of an inserter tray among a plurality of inserter trays, and i=1 denotes the top inserter tray. Next, it is determined whether there is an insert sheet on the inserter tray denoted by 1 or not (step S904). If there is an insert sheet on the inserter tray 20*a*, an image forming operation is started (step S906). If there is no insert sheet on the inserter tray 20*a*, the variable i is successively incremented by 1 until the number reaches k which is the total number of inserter trays, while the presence of insert sheets is determined each time (step S905 and step S907).

In this manner, when the insert mode has been selected, the presence of insert sheets is determined for all the inserter trays, and if there is an insert sheet on any of the inserter trays, an image forming operation is started immediately. Thus, simply by placing one or more insert sheets on any inserter tray, an image forming operation can be started without depressing the copy key so that operability is improved. The operation shown in FIG. 18 is controlled by the CPU 2002.

As explained above, the copying apparatus according to the second embodiment is constructed such that in executing an insert mode for inserting insert sheets between recording sheets having images formed thereon, the insert mode is selected by the operating section 40 together with image forming conditions such as magnification, density, etc., and then the image forming operation as a system operation is started when insert sheets to be inserted are placed on any of the inserter trays, so that a plurality of unnecessary and complicated manipulations for designating the insert mode operation can be eliminated. The possibility of error in the manipulation can be reduced and time required for designating the operating mode can be reduced by virtue of the improved operability by the user, to thereby effectively realize improved system processing capability.

Third Embodiment

An image forming apparatus according to a third embodiment of the present invention has basically the same construction as that according to the first embodiment. The entire construction of the image forming apparatus 1000, and the constructions of the image signal controller 77, the controller 300, and the operating section 40 are the same as those shown in FIGS. 1 to 6.

Figure 19:
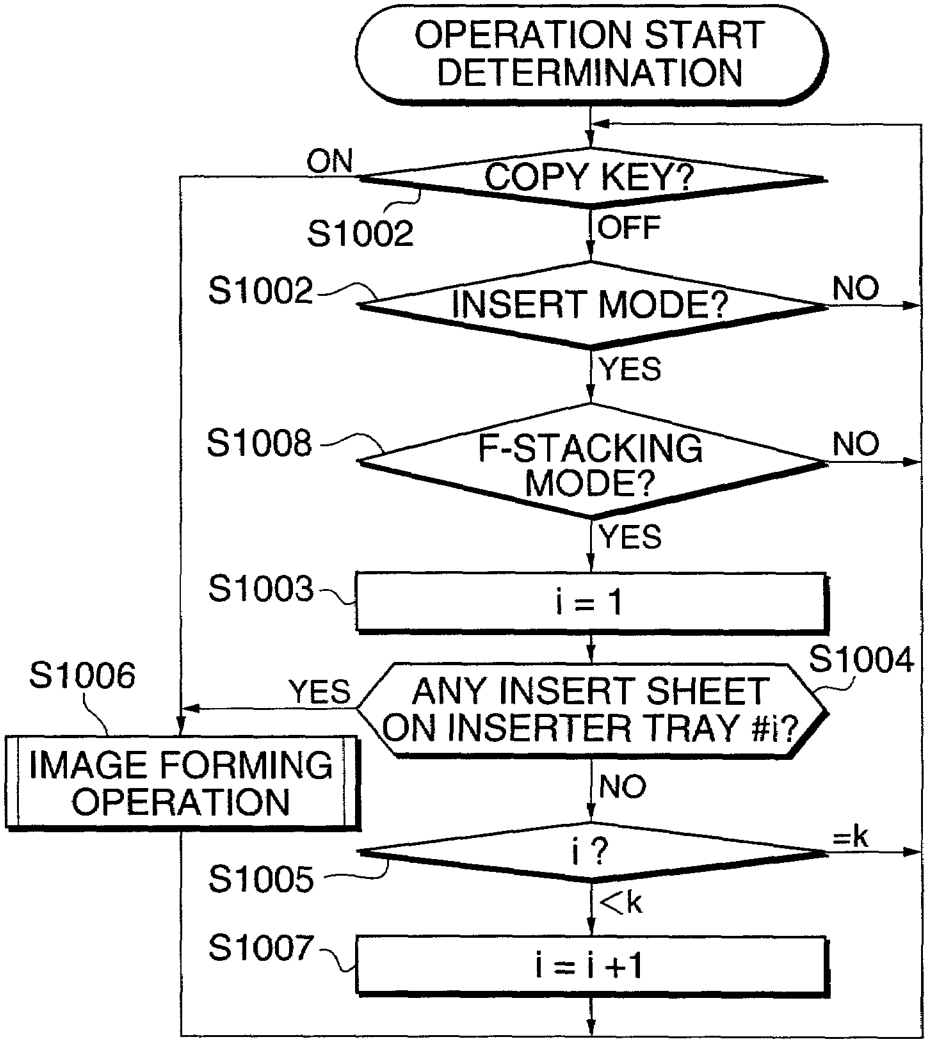
FIG. 19 is a flow chart showing an operation start determining process according to a third embodiment of the present invention.
Figure 20:
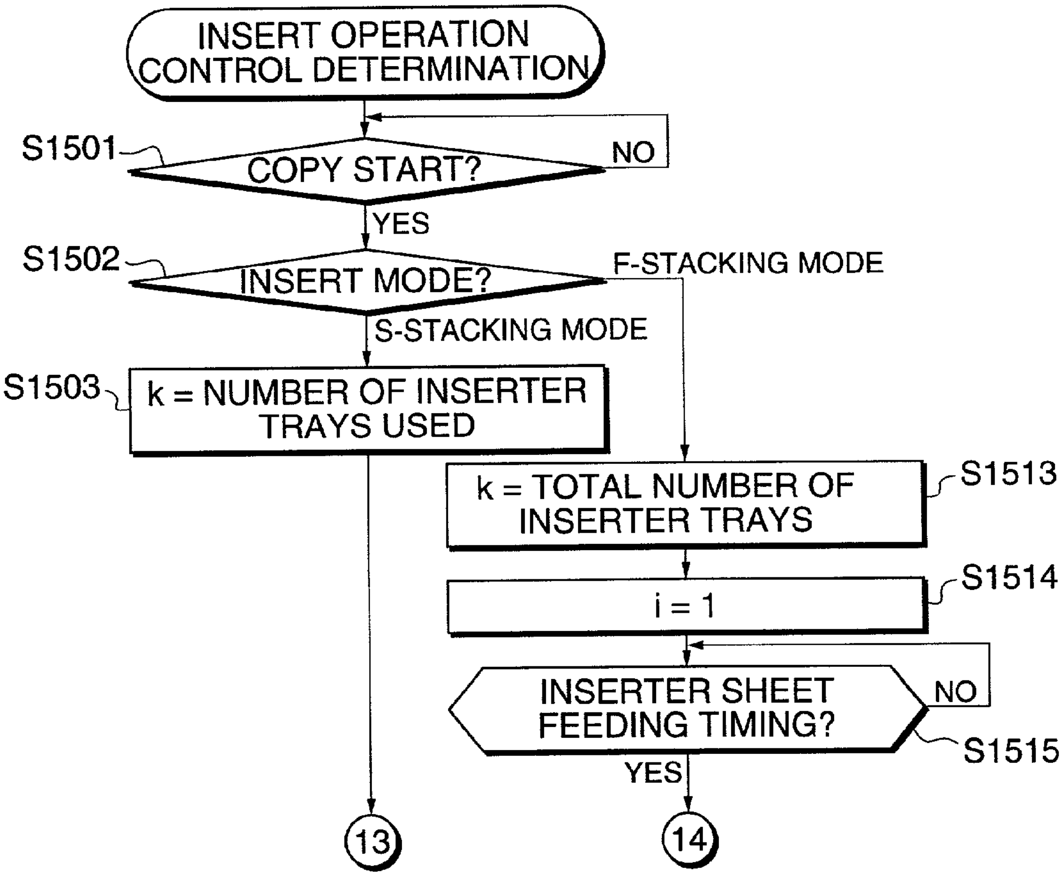
FIG. 20 is a flow chart showing an inserter operation control determining process according to a fourth embodiment of the present invention.
Figure 21:
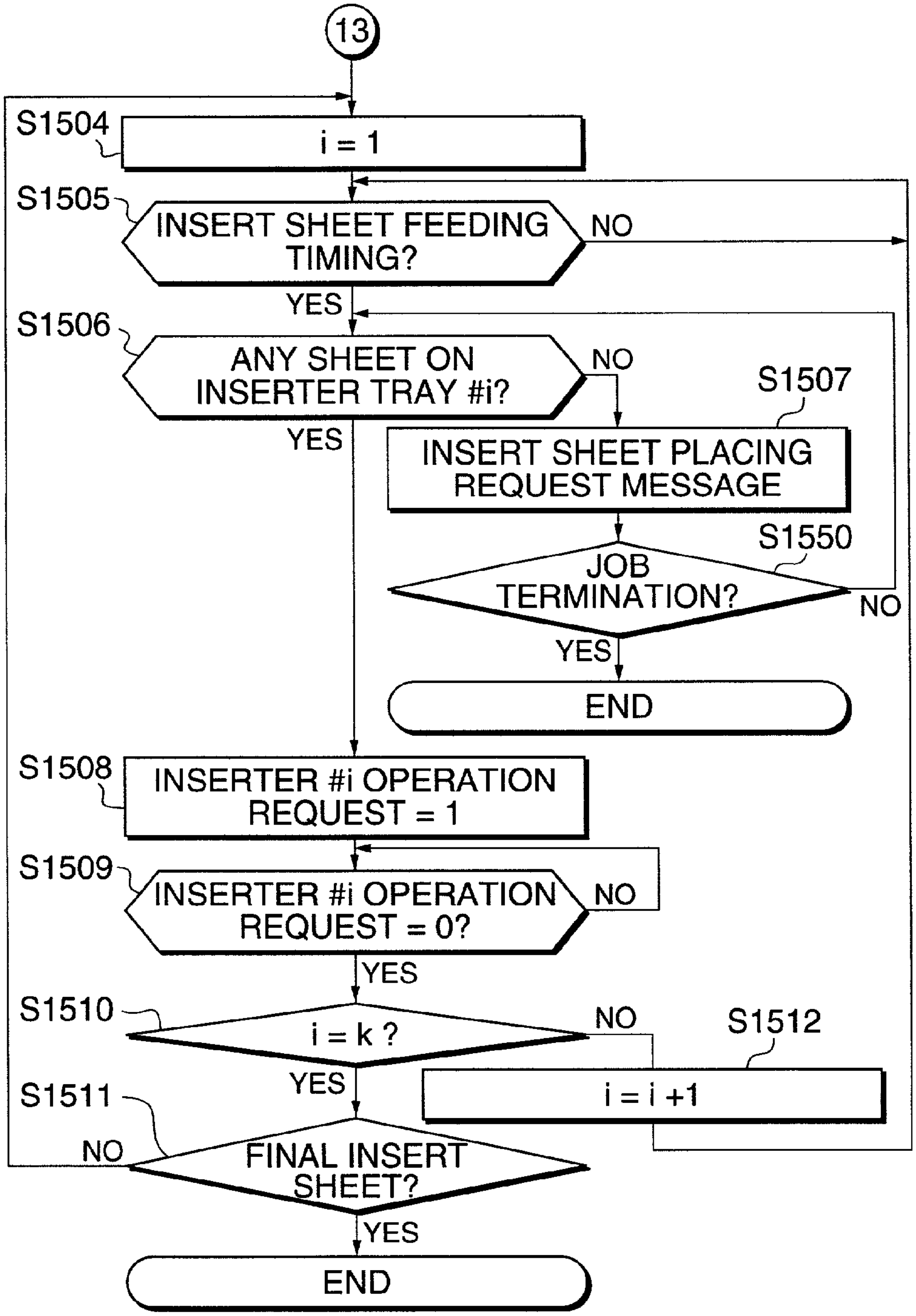
FIG. 21 is a flow chart showing a continued part of the inserter operation control determining process according to the fourth embodiment.
Figure 22:
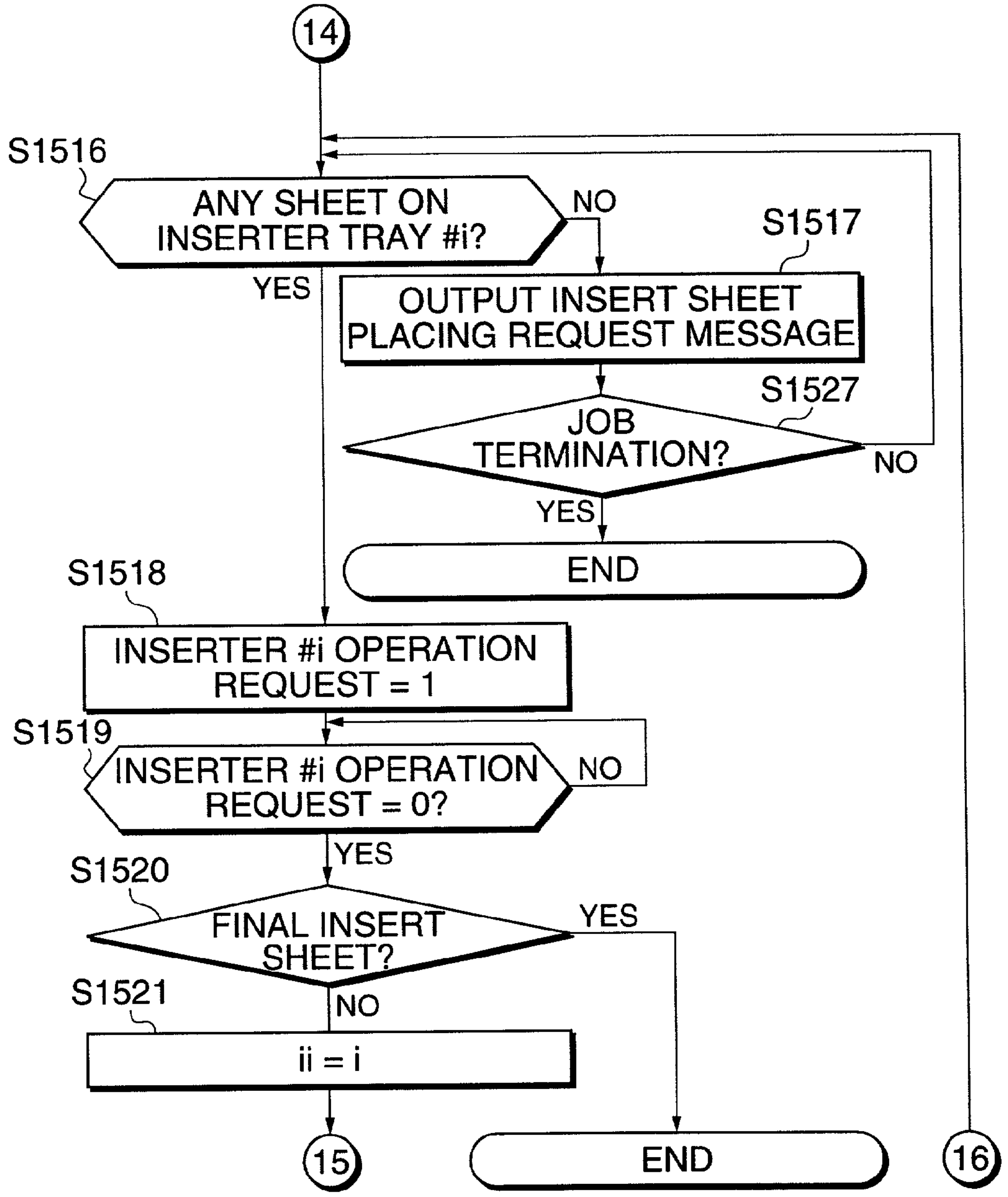
FIG. 22 is a flow chart showing a continued part of the inserter operation control determining process according to the fourth embodiment.
Figure 23:
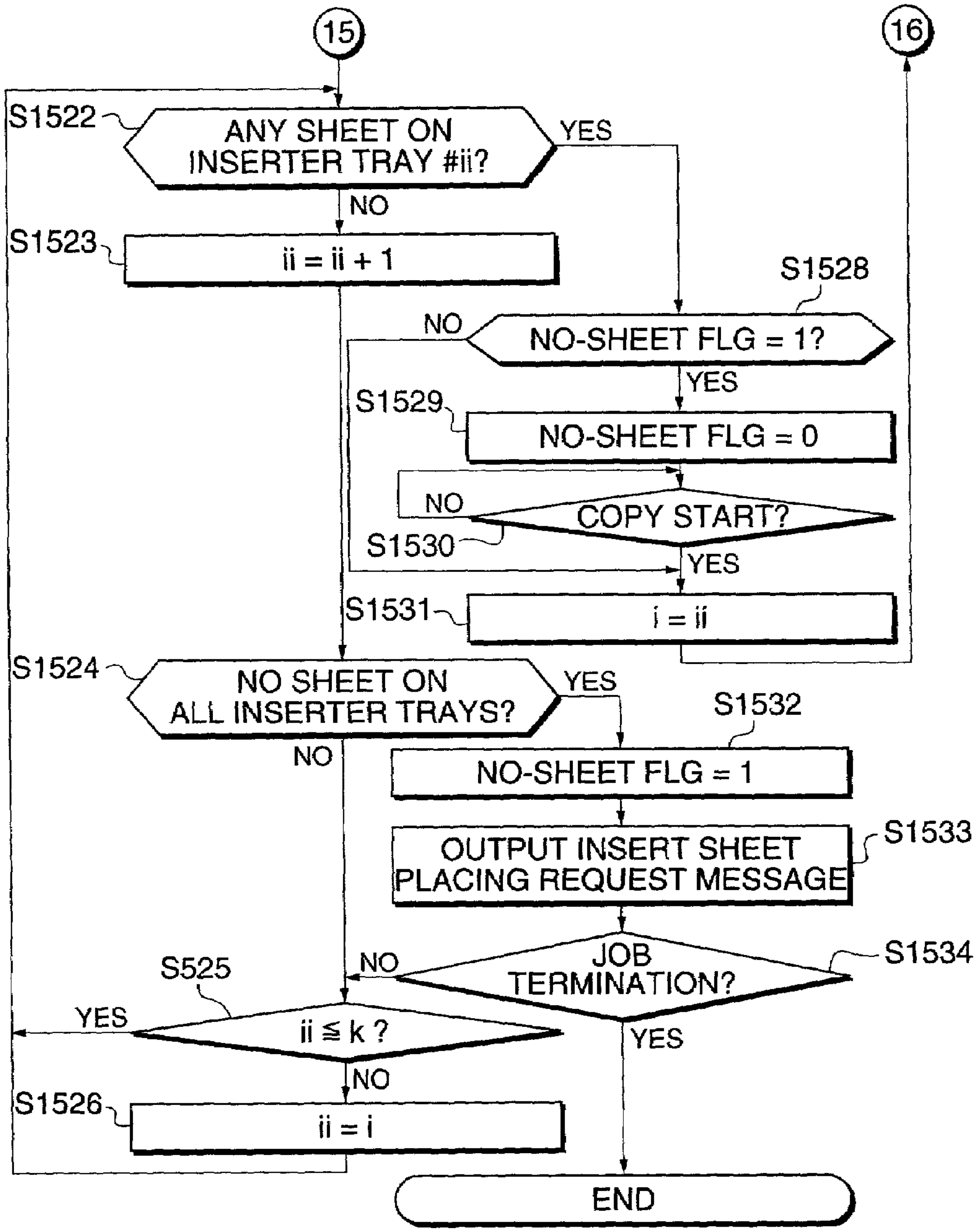
FIG. 23 is a flow chart showing a continued part of the inserter operation control determining process according to the fourth embodiment.

Next, the operation of the copying apparatus according to the third embodiment will be described with reference to FIG. 19.

In the second embodiment described above, when the insert mode is selected, an image forming operation is started upon detection of one or more insert sheets on any inserter tray. However, if there are different insert modes, such an automatic start of the operation may lead to an undesirable result such as disorder of pages, depending upon the selected insert mode. It is possible to avoid such an undesirable result by imposing specific conditions upon a particular insert mode for causing start of the image forming operation. More specifically, the copying apparatus is controlled such that an image forming operation is started upon detection of one or more insert sheets on an inserter tray only when the operating mode is selected to an insert mode in which insert sheets to be inserted are continuously fed from the same inserter tray (F-stacking mode).

<Operation Start Determination Process>

An operation start determination process for determining the start of the operation of the entire system according to the third embodiment will be described with reference to the flow chart of FIG. 19. This is a process for determining conditions for starting operation of the copying apparatus. First, the status of the copy start key 614 of the operating section 40 is determined (step S1001). If the copy start key 614 is on, an image forming operation is started (step S 1006). the step S1006 is continued until the image forming operation is completed and a series of related group of jobs are processed. Upon completion of the jobs, the process returns to the step S1001. If it is determined at the step S1001 that the copy start key 614 is not on, it is determined whether the mode selected by the operating section 40 is an insert mode in which insert sheets stacked on the inserter tray(s) are to be inserted into recording sheets or not (step S1002), and if it is not an insert mode, the process returns to the step S1001.

If it is an insert mode, it is determined whether the selected insert mode is an insert operating mode in which insert sheets are continuously fed from the same inserter tray (F-stacking mode) or not (step S1008). If it is not the F-stacking mode, the process returns to the step S1001. If it is the F-stacking mode, an initial value of 1 is set to the variable i (step S1003). The variable i represents the number of an insert tray among a plurality of inserter trays, and i=1 denotes the top inserter tray. Next, it is determined whether there is an insert sheet on the inserter tray denoted by 1 or not (step S1004). If there is an insert sheet on the inserter tray 20*a*, an image forming operation is started (step S1006). If there is no insert sheet on the inserter tray 20*a*, the variable i is successively incremented by 1 until the number reaches a value k which is the number of inserter trays, while the presence of insert sheets on an inserter tray corresponding to the incremented number k is determined each time (step S1005, step S1007).

In this manner, when the insert mode has been selected, the presence of insert sheets is determined for all the inserter trays, and if there is an insert sheet on any of the inserter trays, an image forming operation is started immediately. Thus, simply by placing an insert sheet or sheets on the inserter tray, the image forming operation can be started so that operability is improved. The operation shown in FIG. 19 is controlled by the CPU 2002.

As explained above, the copying apparatus according to the third embodiment is constructed such that, similarly to the second embodiment, in executing an insert mode for inserting insert sheets between recording sheets having images formed thereon, the insert mode is selected by the operating section 40 together with image forming conditions such as magnification, density, etc., and then the image forming operation as a system operation is started when insert sheets to be inserted are placed on any of the inserter trays, so that a plurality of unnecessary and complicated manipulations for designating the insert mode operation can be eliminated. The possibility of error in the manipulation can be reduced and time required for designating the operating mode can be reduced by virtue of the improved operability by the user, to thereby effectively realize improved system processing capability.

Fourth Embodiment

An image forming apparatus according to a fourth embodiment of the present invention has basically the same construction as that according to the first embodiment. The entire construction of the image forming apparatus 1000, and the constructions of the image signal controller 77, the controller 300, and the operating section 40 are the same as those shown in FIGS. 1 to 6.

Next, the operation of the copying apparatus according to the fourth embodiment will be described with reference to FIGS. 20 to 23.

<Inserter Operation Control>

A procedure of controlling the inserter operation when the insert mode for inserting insert sheets has been selected as the copying mode will first be described with reference to FIGS. 20 to 23. In the fourth embodiment, it is assumed that three inserter trays are used, and three pages of insert sheets are inserted. When copy start is instructed by the operating section 40 (step S1501), it is determined what stacking mode is used to stack insert sheets on the inserter trays, that is, whether the stacking mode is the S-stacking mode or the F-stacking mode (step S1502). As described later, this is determined based on the signal input from the operating section 40.

If the stacking mode of the inserter tray is determined to be the S-stacking mode, the number of pages of insert sheets to be inserted (number of inserter trays to be used), that is, the number 3 is set to the variable k (step S1503). Next, the number of an inserter tray from which an insert sheet is to be fed first, that is, the number 1, is set to the variable i (step S1504). Then, it is determined whether it is timing for inserting an insert sheet or not (step S1505). The timing for inserting an insert sheet has been described before.

If at this point, the inserter sheet feeding timing signal is generated, it is determined that it is the timing for inserting an insert sheet, and then it is determined whether there is an insert sheet on the inserter tray #i or not (step S1506). If there is an insert sheet on the inserter tray #i, the inserter tray #i operation request flag is set to 1, that is, a sheet feeding request for feeding the insert sheet from the inserter tray #i is issued to the inserter 104 (step S1508). If it is determined at the step S1506 that there is no insert sheet on the inserter tray #i, a message is displayed on the display panel 620 to request that insert sheets be placed on the inserter tray #i (step S1507), and the process waits for insert sheets to be supplied. If job termination is instructed while the process is on standby (step S1550), the process is terminated.

If after execution of the step S1508, it is determined that the inserter tray #i operation request flag has been set to 0 by the inserter 104 (step S1509), it is determined whether the variable i is equal to the variable k or not (step S1510). If i=k holds, it is determined whether the final insert sheet of the copy job has been fed or not (step S1511). If the final insert sheet has not been fed, the process returns to the step S1504. If the final insert sheet has been fed, the process of this flow chart is terminated. If i≈k holds at the step S1510, the variable i is incremented by 1 (step S1512), and the process returns to the step S1505.

If it is determined at the step S1502 that the stacking mode of the inserter tray is the F-stacking mode, the number of inserter trays on which insert sheets to be inserted are set (the number of inserter trays used) is set to the variable k (step S1513). Next, the number of an inserter tray from which a sheet is to be fed first, that is, the number 1 is set to the variable i (step S1514), and it is determined whether it is timing for inserting an insert sheet or not (step S1515). If it is the timing for inserting an insert sheet, it is determined whether there is an insert sheet on the inserter tray #i or not (step S1516). If there is an insert sheet on the inserter tray #i, the inserter tray #i operation request flag is set to 1, that is, a sheet feeding request for feeding the insert sheet from the inserter tray #i is issued to the inserter 104 (step S1518). If it is determined at the step S1516 that there is no insert sheet on the inserter tray #i, a message is displayed on the display panel 620 requesting that insert sheets be placed on the inserter tray #i (step S1517), and the process waits for insert sheets to be placed. If job termination is instructed while the process is on standby (step S1527), the process is terminated.

If after execution of the step S1518, it is determined that the inserter tray #i operation request flag has been set to 0 by the inserter 104 (step S1519), it is determined whether the final insert sheet has been fed or not (step S1520). If the final sheet has been fed, the process is terminated. If the final insert sheet has not been fed, the variable i is set to the variable ii (step S1521). Then, it is determined whether there is an insert sheet on the inserter tray #ii or not (step S1522). If it is determined that there is an insert sheet, it is determined whether the no-sheet flag has been set to 1 or not (step S1528). If it is determined that the no-sheet flag has not been set to 1, a step S1531 is executed. If it is determined that the no-sheet flag has been set to 1, the no-sheet flag is set to 0 (step S1529), and the process waits for copy start instruction to be issued from the operating section 40. (step S1530). After copy start has been selected, the variable ii is set to the variable i, that is, the number of an inserter tray from which a sheet is to be fed is set to the variable ii (step S1531). Then, the process returns to the step S1516.

If it is determined at the step S1522 that there is no insert sheet on the inserter tray #ii, the variable ii is incremented by 1, that is, the inserter tray in which presence of an insert sheet is to be detected is changed (step S1523). Next, it is determined whether all the inserter trays have been checked for the presence of insert sheets or not. If all the inserter trays have been checked, the no-sheet flag is set to 1 (step S1532), and a message is displayed on the display panel 620 requesting that insert sheets be placed on the inserter tray (step S1533), and the process waits for insert sheets to be placed. If job termination is instructed while the process is on standby (step S1534), the process is terminated.

If it is determined at the step S1524 that all the inserter trays have not been checked for the presence of insert sheets, the variable k is compared with the inserter tray number ii selected for sheet feeding. If the variable ii is equal to or less than the variable k (step S1525), the process returns to the step S1522. If it is determined at the step S1525 that the variable ii is greater than the variable k, 1 is set to the variable ii (step S1526).

Thus, in the case where the F-stacking mode is set, the copying apparatus can be continuously run without interrupting the execution of a job by supplying insert sheets to the inserter tray that has been emptied of insert sheets. If all the inserter trays have become emptied of insert sheets during the execution of a job, the job can be automatically resumed when it is detected that insert sheets have been placed on any inserter tray again. Operation shown in FIGS. 20 to 23 is controlled by the CPU 2002.

The control of sheet feeding from the inserter 104, insert mode determination control, and inserter sheet feeding timing signal generation control are the same as in the first embodiment.

As explained above, according to the fourth embodiment, after a job is interrupted due to exhaustion of insert sheets stacked on an inserter tray, the user can resume the job by setting insert sheets on the inserter tray and selecting copy start to instruct restart of the job, or by confirming that all the insert sheets to be set on one inserter tray have been set, so that an incorrect inserter operation can be avoided and usage environment for the user can be effectively improved.

Fifth Embodiment

An image forming apparatus according to a fifth embodiment of the present invention has basically the same construction as that according to the first embodiment. The entire construction of the image forming apparatus 1000, and the constructions of the image signal controller 77, the controller 300, and the operating section 40 are the same as those shown in FIGS. 1 to 6.

Figure 24:
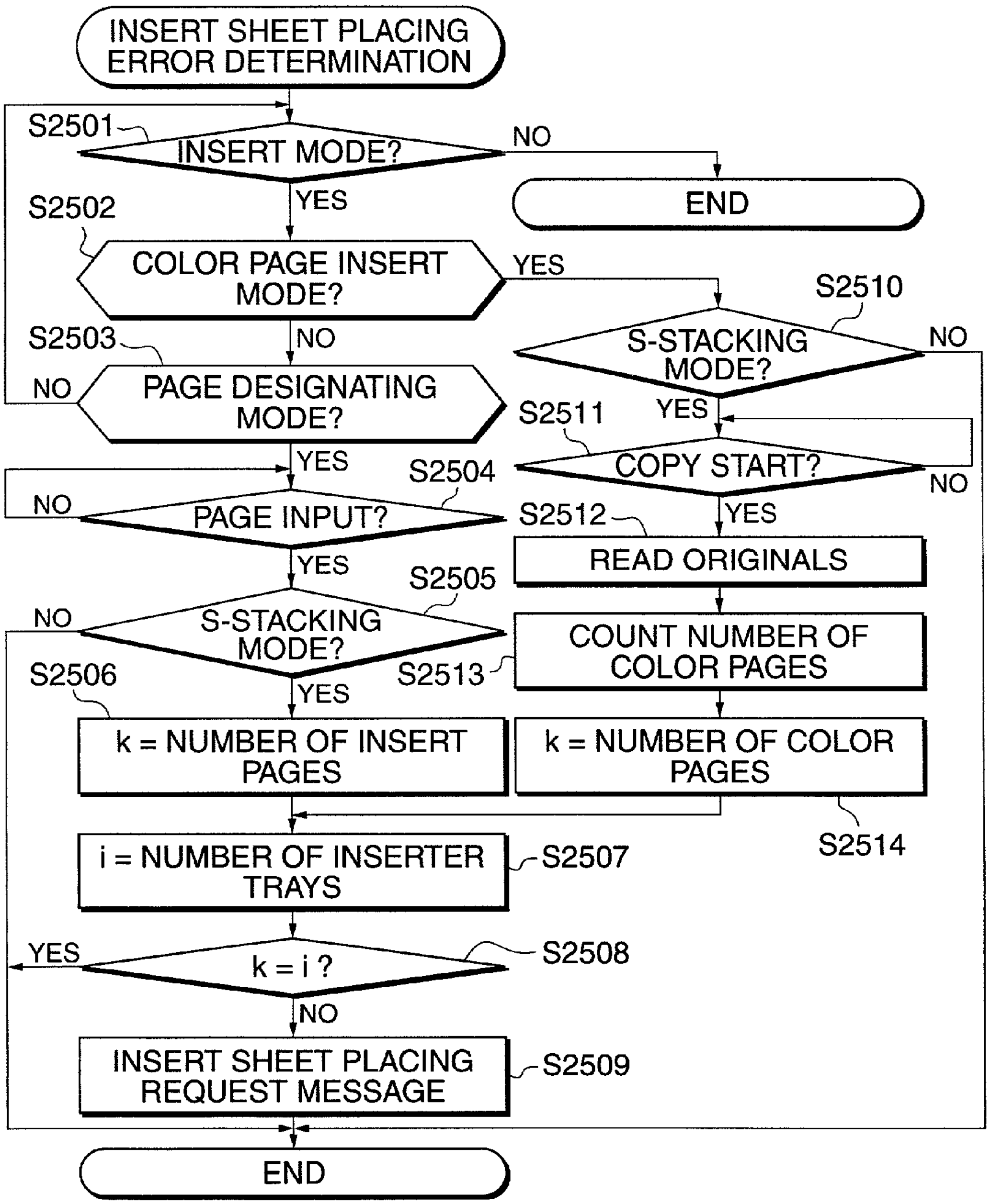
FIG. 24 is a flow chart showing an insert sheet stacking error determining process according to a fifth embodiment of the present invention.

Next, a procedure of inserter sheet stacking error determination according to the fifth embodiment of the present invention will be described with reference to FIG. 24. This determination can be implemented in combination with the above described embodiments as well as embodiments which will be described later.

First, it is determined whether the insert mode has been set by the insert mode key 635 of the operating section 40 or not (step S2501). If it is determined that the insert mode has not been set, the present process is immediately terminated. If the insert mode has been set, it is determined whether a color page insert mode has been set by the color page insert key 638 or not (step S2502).

If it is determined that the color page insert mode has not been set, it is determined whether a page designating mode has been set by the page designating key 639 or not (step S2503). If it is determined that the page designating mode has not been set, the process returns to the above step S2501. On the other hand, if the page designating mode has been set, it is determined whether pages to be fed from the inserter 104 have been input by the user or not (step S2504). This determination is repeatedly executed until the pages are input by the user. If the pages have been input by the user, it is determined whether the S-stacking mode is set by an S-stacking mode key 640 or not (step S2505). This determination is carried out based on a signal from the operating section 40.

If it is determined that the S-stacking mode has not been set, the present process is immediately terminated. If the S-stacking mode has been set, the number of insert pages determined to have been input by the user at the step S2504 is set to the number of insert pages k (step S2506). The number of trays among the inserter trays 20*a* to 20*c* on which insert sheets IS are actually stacked is set to the number of inserter trays i (step S2507). A tray or trays on which the insert sheets IS are stacked is detected by the set insert sheet detection sensor 27, as mentioned before.

Next, it is determined whether the number of insert pages k is the same as the number of inserter trays i or not (step S2508). If it is determined that k=i holds, there is no problem so that the present process is terminated. If k≈i holds, a message is displayed (step S2509), and the present process is terminated. As this message, a message such as "Set insert sheets correctly on the inserter" is displayed on the display panel 620 of the operating section 40. In this manner, incorrect stacking of the insert sheets IS can be quickly notified.

On the other hand, if it is determined at the step 2502 that the color page insert mode has been set, it is determined whether the S-stacking mode has been set by the S-stacking mode key 640 or not (step S2510). Similarly to the above step S2505, this determination is also performed base on a signal from the operating section 40.

If it is determined that that the S-stacking mode has not been set, the present process is immediately terminated. If the S-stacking mode has been set, it is determined whether copy start has been instructed by the start key 614 or not (step S2511). This determination is repeatedly executed until copy start is instructed, and when copy start is instructed, reading of a set of originals P set on the original stacking tray 50 is started (step S2512).

Next, the total number of color pages (color originals) among the set of originals is counted (step S2513). This counting is carried out by determining whether each original is a black-and-white original or a color original based on a signal input to the color determination unit 310 as described before. The image forming operation by the image forming section 102 is not carried out until all the originals P are read and counting of total number of color originals is completed. In this way, an improper and unnecessary image forming operation is avoided.

Next, the total number of color pages obtained by the counting is set to the number of insert pages k (step S2514), and the process returns to the step S2507. At the step S2507 and the following steps, if k≈i holds, a message is displayed as described before.

According to the present embodiment, a plurality of inserter trays 20 are provided and a plurality of sheet feeding modes including the S-stacking mode and the F-stacking mode can be set. A plurality of sheet feeding manners can be realized by stacking insert sheets IS in manners corresponding to the respective stacking modes. Therefore, even if there are plural types of insert sheets IS to be inserted, suitable sheet feeding modes can be selected, respectively, according to these types to facilitate processing and reduce the burden imposed on the user. Thus, the efficiency and operability of the copying operation and the sheet inserting operation for insert sheets IS and others can be improved by providing a plurality of sheet feeding modes that can be arbitrarily set.

In the S-stacking mode, when the number of pages of insert sheets IS to be inserted does not coincide with the number of trays 20*a* to 20*c*, a message is displayed to notify the user. Thus, when the user inadvertently forgets to set insert sheets IS or incorrectly sets insert sheets, the user may be informed of it before the start of the image forming operation, so that wrong processing can be prevented by early notification of incorrect stacking of insert sheets IS.

Besides, the operability can be improved since the number of pages of insert sheets to be inserted can be manually input. On the other hand, where the number of color originals is set as the number of pages of insert sheets, the number of pages is automatically counted without requiring a complicated calculation, etc., so that the processing efficiency can be improved in copying originals with color originals therein. Since the image forming operation is inhibited during counting of color originals, an unnecessary image forming operation due to improper image forming can be avoided.

Sixth Embodiment

Figure 25:
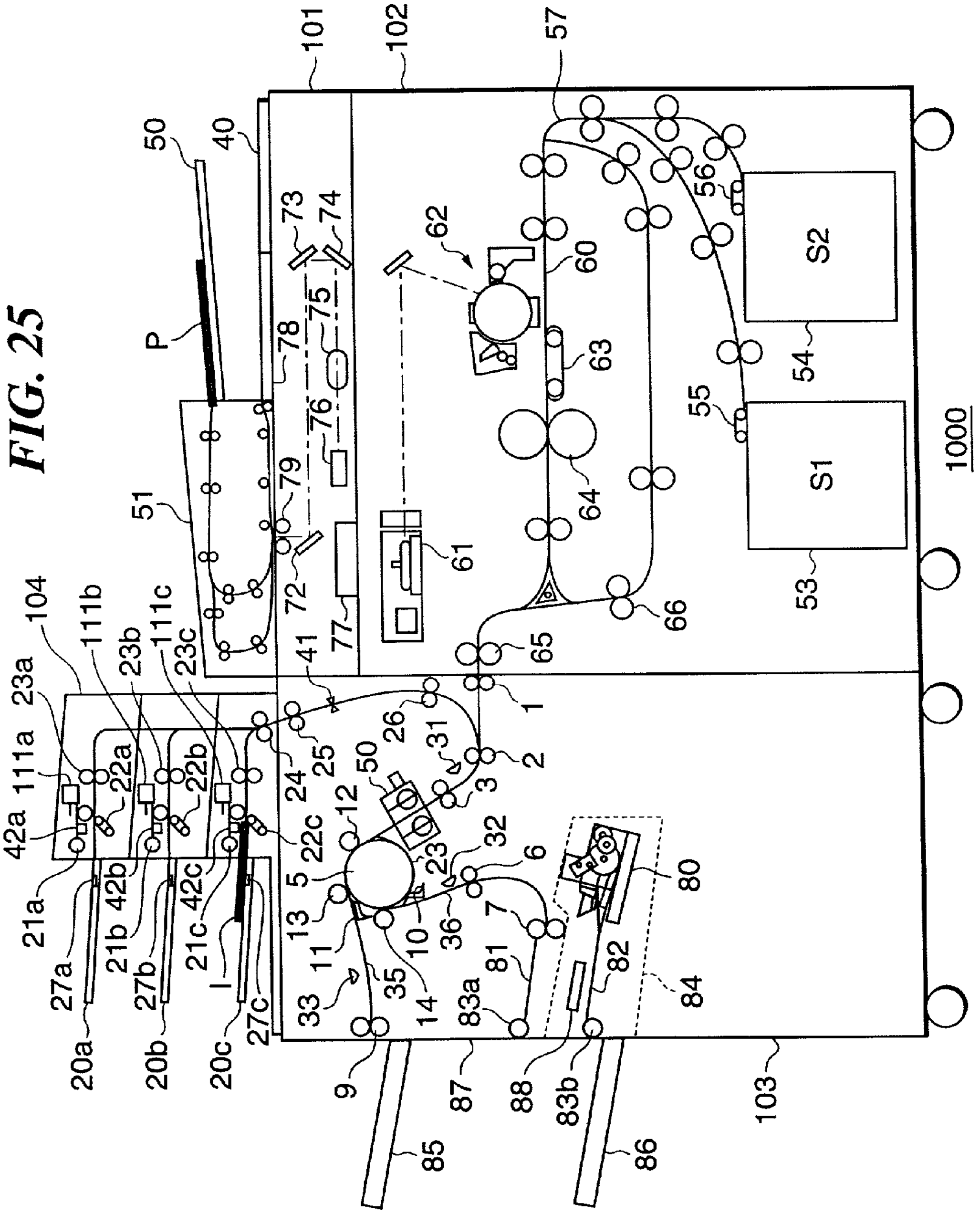
FIG. 25 is a sectional view showing the entire construction of an image forming apparatus according to a sixth embodiment of the present invention.

An image forming apparatus according to a sixth embodiment of the present invention has basically the same construction as that according to the first embodiment. The constructions of the image signal controller 77, the controller 300, and the operating section 40 are as those shown in FIG. 1, and FIGS. 3 to 6. The entire construction of the image forming apparatus 1000 is as that shown in FIG. 25. The sixth embodiment is different from FIG. 2 in that mark reading sensors 42*a*, 42*b*, and 42*c* (hereinafter collectively referred to as the mark reading sensor(s) 42) formed of light reflection type sensors are provided, respectively, on arms for swinging the sheet feeding rollers 21*a*, 21*b*, and 21*c* (hereinafter collectively referred to as the sheet feeding rollers 21), respectively. These arms are swung by driving sheet feeding solenoids 111, and when the sheet feeding rollers 21 are seated on insert sheets IS, the mark reading sensors 42 approach respective positions where marks on the insert sheets can be read.

Figure 26:
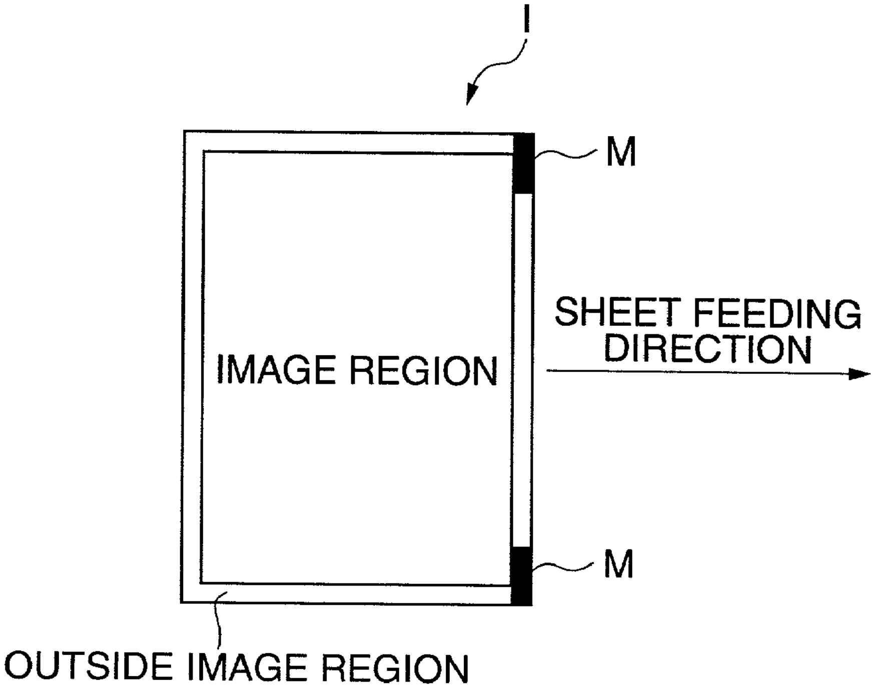
FIG. 26 a view showing an example of an insert sheet IS according to a sixth embodiment.

FIG. 26 is a view showing an example of an insert sheet used in the present embodiment. As shown in the figure, a mark M (predetermined information) is recorded in regions outside an image formed region of the insert sheet IS. The mark M is information indicative of a sheet feeding mode. For example, when the mark M is recorded, it indicates that the F-stacking mode is to be selected, and when the mark M is not recorded, it indicates that the S-stacking mode is to be selected. The mark M is drawn, for example, in a color of different brightness from the color of the insert sheet IS, at a leading edge of the insert sheet IS in the direction of sheet feeding.

The operation of the mark reading sensors 42 is carried out in synchronism with the sheet feeding roller 21, and when the sheet feeding roller 21 is seated on the insert sheets IS, the mark reading sensor 42 comes closest to the insert sheets IS, so that the detection distance from the sensor 42 to the insert sheets IS remains constant irrespective of the thickness of the insert sheet bundle, whereby the detection accuracy can be enhanced.

To set a sheet feeding mode using the mark M, it suffices that the mark M is recorded only on the insert sheet stacked on the top of the insert sheet bundle. By providing the mark M on the insert sheet IS stacked on the top, it is possible to accommodate this sheet feeding mode setting to the sheet feeding construction of sheet feeding by upwardly separating the sheets.

Figure 27:
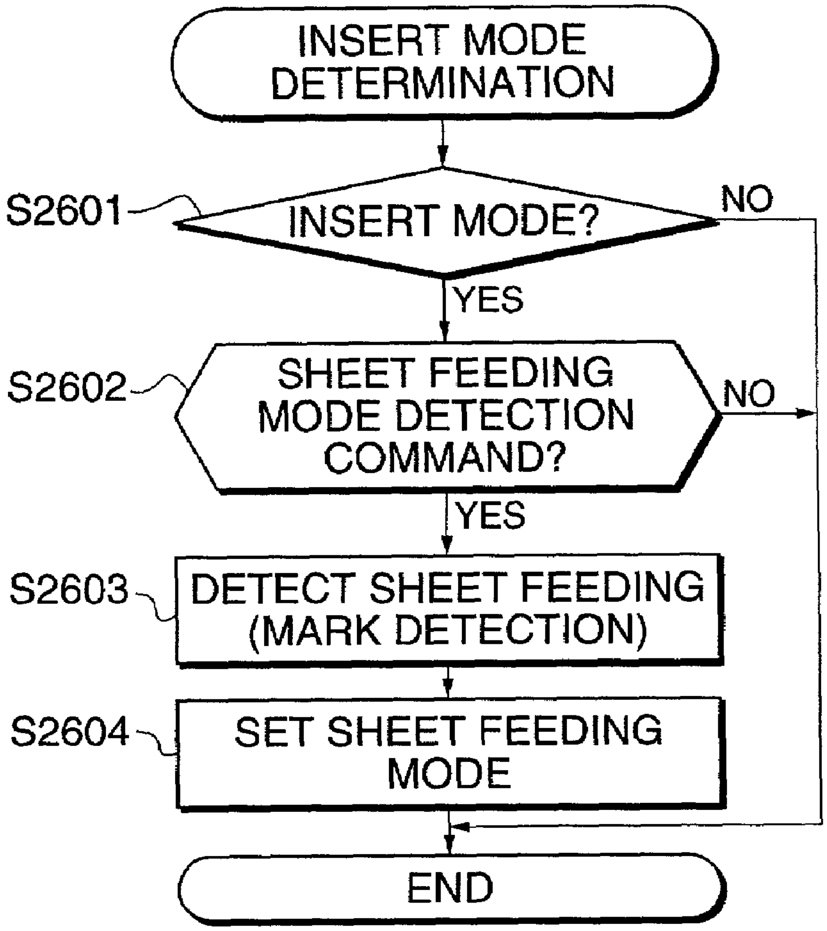
FIG. 27 is a flow chart showing an insert mode determining process.

FIG. 27 is a flow chart showing an insert mode determination process according to the present embodiment.

First, it is determined whether the insert mode (insert sheeting mode) has been selected by depressing the insert mode key 635 or not based on a signal from the operating section 40 (step S2601). If it is determined that the insert mode has not been selected, the present process is immediately terminated. If the insert mode has been selected, it is determined whether a sheet feeding mode detection command has been issued or not (step S2602).

If it is determined that the sheet feeding mode detection command has not been issued, the present process is terminated. If the sheet feeding mode detection command has been issued, the sheet feeding mode is detected (step S2603). Thus, the sheet feeding solenoid 111 is turned on to seat the sheet feeding roller 21 on the inserts sheets IS. Then, in synchronism with this, the mark reading sensor 42 is brought into a position closest to the insert sheets IS, and the presence or absence of the mark M on the top insert sheet IS is read by the mark reading sensor 42. The sheet feeding mode is detected based on the result of the mark reading.

At the following step S2604, the sheet feeding mode is set. That is, if as a result of reading by the mark reading sensor 42, there is the mark M, the F-stacking mode is set, and otherwise, the S-stacking mode is set. Then, the present process is terminated.

According to the present embodiment, the sheet feeding mode is set based on the mark M so that the sheet feeding mode can be set easily using a simple means without requiring manual input or cover sheets or the like.

Also, a common driving means is employed for the mark reading sensor 42 and the sheet feeding roller 21 so that the construction of the apparatus can be simplified by the sharing of this driving means.

The sheet feeding mode can be set reliably based on accurate reading since reading of the mark M is carried out with the mark reading sensor 42 that is brought close to the insert sheet IS. Besides, the reading is carried out in synchronism with the sheet feeding operation by the sheet feeding roller 21 so that quick reading can be achieved by the synchronous operation.

Since the mark M is recorded on the top insert sheet IS, the apparatus can accommodate itself to the sheet feeding construction of sheet feeding by upwardly separating the sheets. Reading of the mark M and setting of the sheet feeding mode can be thereby performed smoothly. Further, since the mark M is recorded on the insert sheet IS outside the image formed region, the image formed region of the insert sheet is not affected. Besides, since he mark M is recorded at the leading edge of the insert sheet in the sheet feeding direction, the mark M can be read quickly and hence the sheet feeding mode can be set promptly.

Although in the present embodiment, the S-stacking mode key 640 and the F-stacking mode key 641 in the display panel 620 are not required, setting with these keys may be selectively used in combination with the above described method of setting the sheet feeding mode.

Seventh Embodiment

An image forming apparatus according to a seventh embodiment of the present invention has basically the same construction as that according to the sixth embodiment. The entire construction of the image forming apparatus 1000, and the constructions of the image signal controller 77, the controller 300, and the operating section 40 are the same as those shown in FIG. 1, FIGS. 3 to 6, and FIG. 25.

Figure 28:
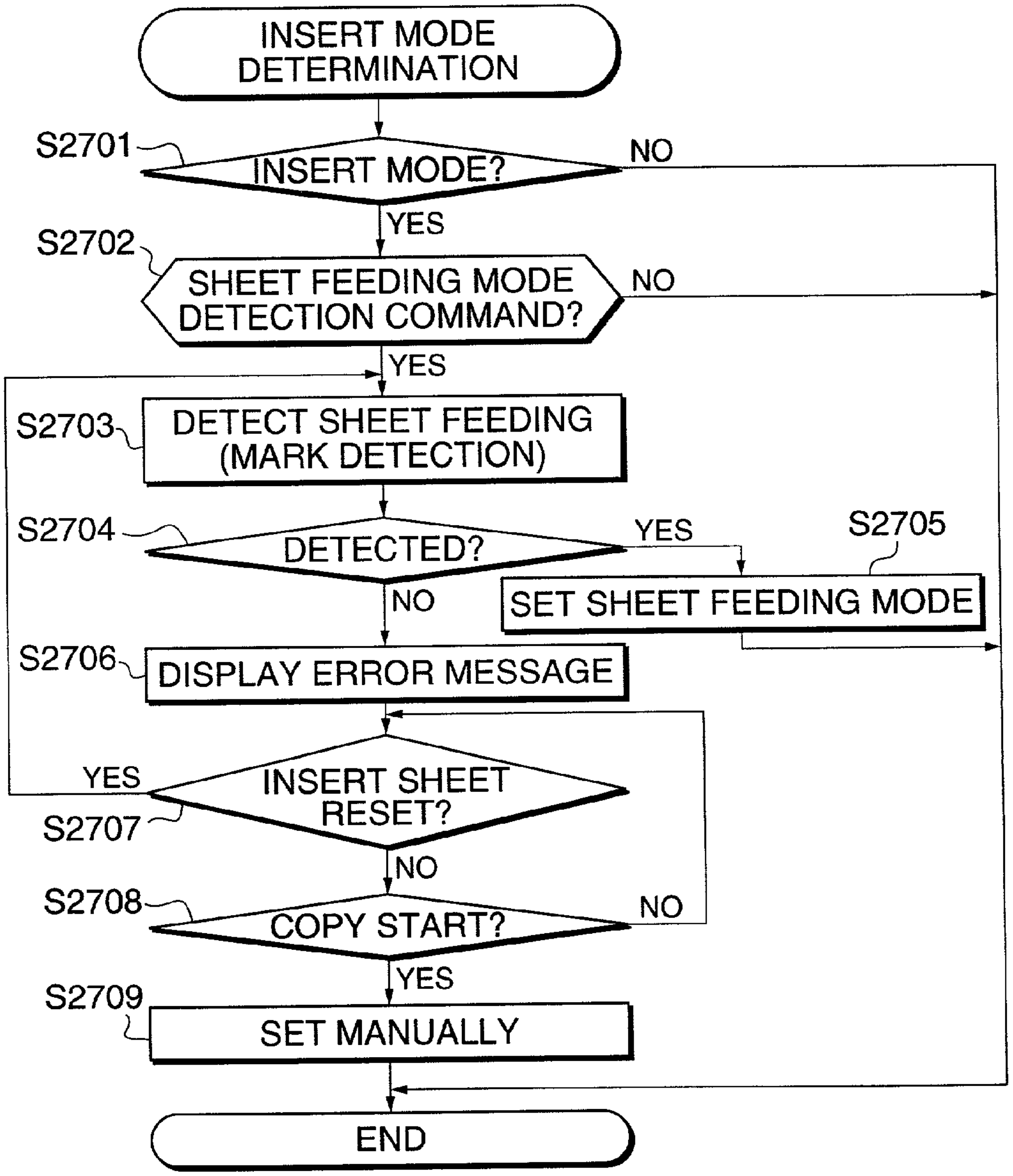
FIG. 28 is a flow chart showing an insert mode determining process according to a seventh embodiment of the present invention.

FIG. 28 is a flow chart showing an insert mode determining process according to the present embodiment.

First, at steps S2701, S2702, and S2703, the same operations as those at the steps S2601, S2602, and S2603 of FIG. 27 are carried out.

At the following step S2704, it is determined whether the sheet feeding mode has been detected by determination of the presence or absence of the mark M on the insert sheet IS at the step 2703 or not. If it is determined that the sheet feeding mode has been detected, the sheet feeding mode is set similarly to the step S2604 of FIG. 27 (step S2705). More specifically, if as a result of the reading by the mark reading sensor 42 there is the mark M, the F-stacking mode is set, and if there is not the mark M, the S-stacking mode is set. Thereafter, the present process is terminated.

On the other hand, if it is determined at the step S2704 that the sheet feeding mode has not been detected, an error message is displayed to inform the user that the operation cannot be continued since the order of the inserter trays 20*a* to 20*c* in which insert sheets IS are to be fed from the inserter trays 20*a* to 20*c* cannot be determined (step S2706) (predetermined warning). For example, a warning message is displayed on the display panel 620 of the operating section 40 to inform that setting of insert sheets IS on the trays 20*a* to 20*c* is not correct.

Then, it is determined based on the detected result of the insert sheet setting detection sensor whether the insert sheets IS on the trays 20*a* to 20*c* have been temporarily removed and again set or not (step S2707). If it is determined that the insert sheets IS on the trays 20*a* to 20*c* have been temporarily removed and again set, the process returns to the step S2703. If the insert sheets IS have not been removed, it is determined whether the copy start has been again instructed or not (step S2708).

If it is determined that the copy start has not been again instructed, the process returns to the step S2707. If the copy start has been again instructed, the sheet feeding mode is manually set on the setting screen view as shown in FIG. 29, while the detected result of the insert sheet setting detection sensor 27 is neglected (step S2709).

Figure 29:
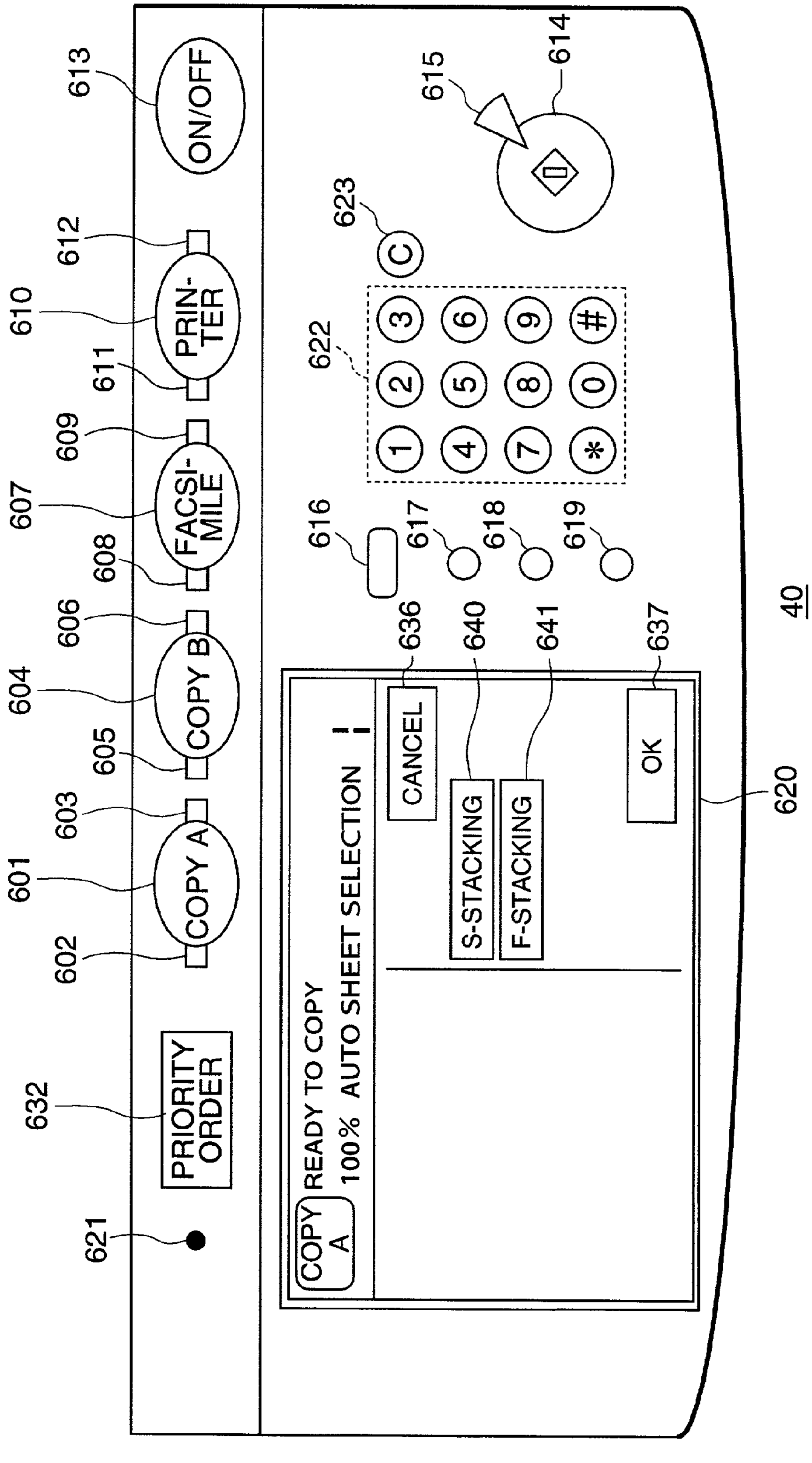
FIG. 29 is a view showing the surface layout of an operating section.

FIG. 29 is a view showing the surface layout of the operating section 40. On the display panel 620 as shown in the FIG. 29, a sheet feeding mode setting view is displayed that is displayed when the sheet feeding mode is not detected at the step S2704. The user can manually set the sheet feeding mode on this sheet feeding mode setting view, by depressing the S-stacking mode key 640 or the F-stacking mode key 641 displayed on the display panel 620.

After setting the sheet feeding mode in this way at the step S2709, the present process is terminated. No sheet feeding operation for the recording sheet is carried out until the sheet feeding mode is set.

According to the present embodiment, as described above, an error message is displayed when the sheet feeding mode cannot be detected by the determination of the presence or absence of the mark M on insert sheets IS. Therefore, the user is urged immediately to take appropriate action such as re-setting of the insert sheets IS. Further, the sheet feeding mode cannot be set unless the copy restart is instructed, until re-setting of the insert sheets IS is carried out, so that improper setting of the sheet feeding mode can be avoided. Besides, even if the sheet feeding mode is not detected, the sheet feeding mode can be manually set by the user. Thus, depending on the user's response, the sheet feeding mode can be set quickly, and operability is thereby improved.

Further, the sheet feeding operation for recording sheets S is not carried out until the sheet feeding mode is set, wrong processing due to an improper sheet feeding mode can be avoided.

When the sheet feeding mode cannot be detected by the determination of the presence or absence of the mark M, setting of the sheet feeding mode may be suspended indiscriminately until re-stacking of insert sheets on the inserter tray concerned is detected. Setting of an improper sheet feeding mode can be thereby positively avoided.

In the embodiments described above, the sheet feeding mode is not limited to two kinds, that is, the S-stacking mode and the F-stacking mode, which are shown only as examples. Also, the number of the trays 20*a* to 20*c* is not limited to three.

Other Embodiments

In the above described embodiments, copying apparatuses constructed as shown in FIGS. 1 to 6, and FIG. 25 are illustrated by way of example. However, the present invention is not limited to the constructions as shown in FIGS. 1 to 6, and FIG. 25. For example, the number of inserter trays in the sheet processing section 103, the number of recording sheet storing units provided in the image forming section 102, types of keys in the operating section 40, and others may be changed as required within the spirit and scope of the present invention.

Although in the above described embodiments, copying apparatuses alone are illustrated, the present invention is not limited to this, but may be equally applied to a system constructed of a copying apparatus of the present invention, an information processing apparatus (computer), a printing apparatus (printer), and others, which are connected with each other via a communication medium such as a LAN.

The present invention may be applied both to a system constructed of a plurality of apparatuses or devices, and to an apparatus composed of a single apparatus or device.

It is to be understood that the present invention may also be realized by supplying a system or an apparatus with a storage medium in which a program code of software that realizes the functions of any one of the above described embodiments is recorded, and causing a computer (or CPU, MPU) of the system or apparatus to read out and execute the program code stored in the storage medium.

In this case, the program code itself read out from the storage medium realizes the above described functions of the embodiment, so that the storage medium storing the program code also constitutes the present invention.

The storage medium for supplying the program code may be selected from, for example, a floppy disk, hard disk, optical disk, magneto-optical disk, CD-ROM, CD-R, magnetic tape, non-volatile memory card, and ROM.

The functions of the above described embodiments may be accomplished not only by executing a program code read out by a computer, but also by causing an operating system (OS) that operates on the computer, to perform a part or the whole of the actual operations according to instructions of the program code.

Furthermore, it is to be understood that the program code read out from the storage medium may be written into a memory provided in an expanded board inserted in the computer, or an expanded unit connected to the computer, and a CPU, or the like, provided in the expanded board or expanded unit may actually perform a part or the whole of the operations according to the instructions of the program code, so as to accomplish the functions of the above described embodiments.

What is claimed is:

1. A sheet handling apparatus comprising:

a receiving section that receives recording sheets transported from an image forming apparatus having an image forming section for forming an image on a sheet;

a plurality of inserter trays for having insert sheets stacked thereon;

a plurality of feeders that feed the insert sheets stacked on respective inserter trays;

a sheet feeding controller that controls feeding of the insert sheets stacked on the plurality of inserter trays so that the insert sheets are inserted between the recording sheets transported from the image forming apparatus;

a transporting device that transports recording sheets received from the image forming apparatus and insert sheets fed from at least one of said plurality of inserter trays to a discharge tray; and a sheet feeding mode setting device that sets one of a plurality of sheet feeding modes corresponding respectively to a plurality of stacking manners, wherein said sheet feeding modes include at least a first sheet feeding mode in which said sheet feeding controller controls said feeders to sequentially feed the insert sheets from a different one of said inserter trays every time an insert sheet is fed, and a second feeding mode in which said sheet feeding controller controls said feeders to sequentially feed the insert sheets from only one of the inserter trays unless the one inserter tray is empty.

2. A sheet handling apparatus according to claim 1, wherein said sheet feeding controller controls feeding of the insert sheets stacked on said plurality of inserter trays in accordance with the sheet feeding mode set by said sheet feeding mode setting device.

3. A sheet handling apparatus according to claim 1, wherein said plurality of sheet feeding modes include at least a first sheet feeding mode in which a same type of insert sheets are stacked on each of said plurality of inserter trays, and a second sheet feeding mode in which plural types of said insert sheets are stacked together on at least one of said plurality of inserter trays.

4. A sheet handling apparatus according to claim 3, wherein in said first sheet feeding mode, said sheet feeding controller sequentially feeds the insert sheets sheet by sheet from one of said plurality of inserter trays, and then changes to another of said inserter trays.

5. A sheet handling apparatus according to claim 3, wherein in said second sheet feeding mode, said sheet feeding controller sequentially feeds the plural types of said insert sheets stacked together on said at least one of the inserter trays sheet by sheet starting from a top page sheet of the insert sheets.

6. A sheet handling apparatus according to claim 3, comprising an insert sheet number determining device that determines a total number of the insert sheets to be inserted between the recording sheets, a sheet stacking detector that detects presence or absence of the insert sheets stacked on each of said plurality of inserter trays, a comparator operable in said first sheet feeding mode to compare the total number of the insert sheets determined by said insert sheet number determining device with a total number of inserter trays on which presence of the insert sheets stacked thereon is detected by said sheet stacking detector, and a warning device that gives a predetermined warning if a result of the comparison by said comparator shows that the total number of the insert sheets does not coincide with the total number of the inserter trays.

7. A sheet handling apparatus according to claim 6, wherein said insert sheet number determining device determines the total number of the insert sheets through manual input by a user.

8. A sheet handling apparatus according to claim 6, wherein said image forming apparatus comprises an original reading device that reads images on a set of originals for forming images on the recording sheets, and a color original counter that recognizes color originals from said set of originals based on the images read by said original reading device and counts a number of the recognized color originals; and wherein said insert sheet number determining device determines the number of color originals counted by said color original counter as the total number of the insert sheets to be inserted between the recording sheets.

9. A sheet handling apparatus according to claim 8, comprising an image formation inhibiting device that inhibits image formation by said image forming section while said counting of color originals is being carried out by said color original counter.

10. A sheet handling apparatus according to claim 1, comprising a predetermined information reading device that reads predetermined information indicative of said sheet feeding mode recorded on a predetermined one of the insert sheets in advance, and said sheet feeding mode setting device sets said sheet feeding mode based on said predetermined information read by said predetermined information reading device.

11. A sheet handling apparatus according to claim 10, wherein said predetermined information is recorded at a location outside an image formed region of said predetermined one of the insert sheets.

12. A sheet handling apparatus according to claim 10, wherein said predetermined information is recorded on a leading edge portion of said predetermined one of the insert sheets.

13. A sheet handling apparatus according to claim 10, wherein said predetermined one of the insert sheets is a top one of the insert sheets stacked on each of said plurality of inserter trays.

14. A sheet handling apparatus according to claim 10, wherein said predetermined information reading device is brought into a position close to the insert sheets to read said predetermined information.

15. A sheet handling apparatus according to claim 10, wherein said sheet feeding controller comprises a driver for carrying out a sheet feeding operation for feeding the insert sheets stacked on said plurality of inserter trays, said driver being disposed to drive said predetermined information reading device.

16. A sheet handling apparatus according to claim 15, wherein said reading by said predetermined information reading device is carried out in synchronism with the feeding of the insert sheets by said sheet feeding controller.

17. A sheet handling apparatus according to claim 10, wherein said predetermined information reading device comprises at least one light reflection type sensor, and said predetermined information comprises a mark with a color being different in brightness from color of said predetermined one of the insert sheets.

18. A sheet handling apparatus according to claim 10, comprising an error display device that displays failure to read said predetermined information by said predetermined information reading device.

19. A sheet handling apparatus according to claim 10, comprising a re-stacking detector that detects re-stacking of the insert sheets on said plurality of inserter trays, and said sheet feeding mode setting device is responsive to failure to read said predetermined information by said predetermined information reading device, for suspending setting of the sheet feeding mode until the re-stacking of the insert sheets is detected.

20. A sheet handling apparatus according to claim 10, wherein said sheet feeding mode setting device is responsive to failure to read said predetermined information by said predetermined information reading device, for setting the sheet feeding mode through manual setting by a user.

21. A sheet handling apparatus according to claim 10, comprising a recording sheet feeding inhibiting device responsive to failure to set the sheet feeding mode based on said predetermined information read by said predetermined information reading device, for inhibiting feeding of the recording sheets.

22. A sheet handling apparatus according to claim 1, wherein said sheet feeding mode setting device sets the sheet feeding mode through manual setting by a user.

23. A sheet handling apparatus according to claim 1, wherein the insert sheets stacked on the plurality of inserter trays are fed so as to bypass said image forming section.

24. A machine readable storage medium storing a program for controlling a sheet handling apparatus comprising a receiving section that receives recording sheets transported from an image forming apparatus having an image forming section for forming an image on a sheet, a plurality of inserter trays for stacking insert sheets thereon, and a transporting device that transports recording sheets received from the image forming apparatus and insert sheets fed from at least one of the plurality of inserter trays to a discharge tray, the program including codes for:

controlling feeding of the insert sheets stacked on the respective inserter trays so that the insert sheet is inserted between the recording sheets transported from said image forming apparatus; and setting one of a plurality of sheet feeding modes corresponding respectively to a plurality of stacking manners, wherein said feeding modes include at least a first sheet feeding mode in which the insert sheets are sequentially fed from a different inserter tray every time an insert sheet is fed, and a second feeding mode in which the insert sheets are sequentially fed from only one of the inserter trays unless the one inserter tray is empty.

25. A sheet handling apparatus comprising:

a receiving section that receives recording sheets transported from an image forming apparatus having an image forming section for forming an image on a sheet;

at least one inserter tray for having insert sheets stacked thereon, the insert sheets being insertable between the recording sheets transported from the image forming apparatus;

a sheet feeder that feeds the insert sheets stacked on said inserter tray:

a sheet feeding controller that controls feeding of the insert sheets stacked on said inserter tray so that the insert sheets are inserted between the recording sheets transported from the image forming apparatus;

a transporting device that transports recording sheets received from the image forming apparatus and insert sheets fed from said inserter tray to a discharge tray; and a stacking manner input terminal that selects a desired stacking manner from at least two kinds of stacking manners, for stacking the insert sheets on said inserter tray, wherein said sheet feeding controller is operable when a predetermined stacking manner is selected by said stacking manner input terminal, for controlling said sheet feeder to feed the insert sheets from said inserter tray without interrupting a job being executed when insert sheets are re-stacked on said inserter tray after exhaustion of all the insert sheets stacked on said inserter tray.

26. A sheet handling apparatus according to claim 25, wherein said at least two kinds of stacking manners include a first stacking manner in which a single type of insert sheets are stacked on said inserter tray, and a second stacking manner in which plural types of insert sheets are stacked on said inserter tray, and wherein said controller is responsive to selection of said second stacking manner by the stacking manner input terminal, for controlling said sheet feeder to feed the insert sheets from said inserter tray without interrupting the job being executed if insert sheets are re-stacked on said inserter tray after exhaustion of all the insert sheets stacked on said inserter tray.

27. A sheet handling apparatus according to claim 25, further comprising a reading device that reads images on originals, an image forming device provided in said image forming section, for forming images on the recording sheets based on the images read by said image reading device, a post processing device comprising said inserter tray, and said sheet feeder, said post processing device carrying out a post process of inserting the insert sheets which are fed so as to bypass said image forming device, between the recording sheets having the images formed thereon by said image forming device, and an insert information input terminal that inputs at least one inserting position of the recording sheets having the images formed thereon by said image forming device where the insert sheets are to be inserted, said inserter tray comprising a plurality of inserter trays, and wherein said controller controls an order of said plurality of inserter trays in which the insert sheets are fed from said plurality of inserter trays by said sheet feeder, based on information input from said stacking manner input terminal.

28. A sheet handling apparatus according to claim 25, wherein said inserter tray comprises a plurality of inserter trays, the image forming apparatus further comprising a plurality of insert sheet detectors provided in a fashion corresponding respectively to said plurality of inserter trays, for detecting presence or absence of at least one insert sheet on said inserter trays, and an insert mode selector that selects an insert mode for inserting the insert sheets between the recording sheets, and wherein said controller is responsive to selection of said insert mode by said insert mode selector, for controlling said image forming device to start an image forming operation if at least one insert sheet is detected by any of said plurality of insert sheet detectors.

29. A sheet handling apparatus according to claim 28, wherein said controller controls said insert sheet detectors to determine presence or absence of insert sheets on said plurality of inserter trays in order from upper ones to lower ones in a vertical direction.

30. A sheet handling apparatus according to claim 28, wherein said controller controls said insert sheet detectors to determine presence or absence of insert sheets on said plurality of inserter trays in order from lower ones to upper ones in a vertical direction.

31. A sheet handling apparatus according to claim 25, wherein said at least two kinds of stacking manners include a first stacking manner in which a single type of insert sheets are stacked on said inserter tray, and a second stacking manner in which plural types of insert sheets are stacked on said inserter tray, said inserter tray comprising a plurality of inserter trays, the image forming apparatus further comprising a plurality of insert sheet detectors provided in a fashion corresponding respectively to said plurality of inserter trays, for detecting presence or absence of at least one insert sheet on said inserter trays, and an insert mode selector that selects an insert mode for inserting the insert sheets between the recording sheets, and wherein said controller is responsive to selection of said insert mode by said insert mode selector and selection of said second stacking manner by said stacking manner input terminal, for controlling said image forming device to start an image forming operation, if at least one insert sheet is detected by any of said plurality of insert sheet detectors.

32. A sheet handling apparatus according to claim 25, further comprising an insert sheet detector that detects at least one insert sheet stacked on said inserter tray, and wherein said at least two kinds of stacking manners include a first stacking manner in which a single type of insert sheets are stacked on said inserter tray, and a second stacking manner in which plural types of insert sheets are stacked on said inserter tray, said inserter tray comprising one or a plurality of inserter trays, and wherein said controller is responsive to exhaustion of all the insert sheets stacked on said one or said plurality of inserter trays while said second stacking manner is selected by said stacking manner input terminal during outputting of said job and detection of re-stacking of at least one insert sheet on said one or said plurality of inserter trays by said insert sheet detector, for controlling said sheet feeder to start feeding the at least one insert sheet from said one or said plurality of inserter trays upon lapse of a predetermined period of time after said detection of re-stacking.

33. A sheet handling apparatus according to claim 25, further comprising an insert sheet detector that detects at least one insert sheet stacked on said inserter tray, and a job restart input terminal for instructing restart of a job, said at least two kinds of stacking manners including a first stacking manner in which a single type of insert sheets are stacked on said inserter tray, and a second stacking manner in which plural types of insert sheets are stacked on said inserter tray, said inserter tray comprising one or a plurality of inserter trays, and wherein said controller is responsive to exhaustion of all the insert sheets stacked on said one or said plurality of inserter trays while said second stacking manner is selected by said stacking manner input terminal during outputting of said job and detection of restacking of at least one insert sheet on said one or said plurality of inserter trays by said insert sheet detector, for controlling said sheet feeder to feed the at least one insert sheet from said one or said plurality of inserter trays if the restart of said job is instructed by said job restart input terminal after the detection of re-stacking of the at least one insert sheet by said insert sheet detector.

34. A sheet handling apparatus comprising:

a receiving section that receives recording sheets transported from an image forming apparatus having an image forming section for forming an image on a sheet;

at least one inserter tray for stacking thereon insert sheets to be inserted between recording sheets having images formed thereon in the image farming apparatus;

a sheet feeder for feeding the insert sheets stacked on the inserter tray;

a sheet feeding controller that controls feeding of the insert sheets stacked on said inserter tray so that the insert sheets are inserted between the recording sheets transported from the image forming apparatus;

a transporting device that transports recording sheets received from the image forming apparatus and insert sheets fed from said inserter tray to a discharge tray, wherein while a predetermined stacking manner is selected from at least two kinds of stacking manners for stacking insert sheets on said inserter tray, said sheet feeder is controlled to feed insert sheets from said inserter tray without interrupting a job being executed if the insert sheets stacked on said inserter tray are exhausted and thereafter insert sheets are re-stacked on said inserter tray.

35. A sheet handling apparatus according to claim 34, wherein said at least two kinds of stacking manners include a first stacking manner in which a single type of insert sheets are stacked on said inserter tray, and a second stacking manner in which plural types of insert sheets are stacked on said inserter tray, and wherein when said second stacking manner is selected, said sheet feeder is controlled to feed the insert sheets from said inserter trays without stopping the job being executed if the insert sheets stacked on said inserter tray are exhausted and thereafter insert sheets are re-stacked on said inserter tray.

36. A sheet handling apparatus according to claim 34, further comprising a post processing device comprising said inserter tray, and said sheet feeder, said post processing device carrying out a post process of inserting the insert sheets which are fed so as to bypass said main body of said image forming apparatus, between the recording sheets having the images formed thereon in said main body of said image forming apparatus, said inserter tray comprising a plurality of inserter trays, and wherein an order of said plurality of inserter trays in which the insert sheets are fed from said plurality of inserter trays by said sheet feeder is controlled based on input information on said stacking manner.

37. A sheet handling apparatus according to any one of claim 34, wherein said inserter tray comprises a plurality of inserter trays, the apparatus further comprising a plurality of insert sheet detectors provided in a fashion corresponding respectively to said plurality of inserter trays, for detecting presence or absence of at least one insert sheet on said inserter trays, and wherein when an insert mode for inserting the insert sheets between the recording sheets is selected, an image forming operation is started in said main body of said image forming apparatus if at least one insert sheet is detected by any of said plurality of insert sheet detectors.

38. A sheet handling apparatus according to claim 37, wherein said insert sheet detectors are controlled to determine presence or absence of insert sheets on said plurality of inserter trays in order from upper ones to lower ones in a vertical direction.

39. A sheet handling apparatus according to claim 37, wherein said insert sheet detectors are controlled to determine presence or absence of insert sheets on said plurality of inserter trays in order from lower ones to upper ones in a vertical direction.

40. A sheet handling apparatus according to claim 34, wherein said at least two kinds of stacking manners include a first slacking manner in which a single type of insert sheets are stacked on said inserter tray, and a second stacking manner in which plural types of insert sheets are stacked on said inserter tray, said inserter tray comprising a plurality of inserter trays, the image forming apparatus further comprising a plurality of insert sheet detectors provided in a fashion corresponding respectively to said plurality of inserter trays, for detecting presence or absence of at least one insert sheet on said inserter trays, and wherein when an insert mode for inserting the insert sheets between the recording sheets is selected and said second stacking manner is selected, an image forming operation is started in said main body of said image forming apparatus if at least one insert sheet is detected by any of said plurality of insert sheet detectors.

41. A sheet handling apparatus according to claim 34, further comprising a plurality of insert sheet detectors provided in a fashion corresponding respectively to said plurality of inserter trays, for detecting presence or absence of at least one insert sheet on said inserter trays, said at least two kinds of stacking manners including a first stacking manner in which a single type of insert sheets are stacked on said inserter tray, and a second stacking manner in which plural types of insert sheets are stacked on said inserter tray, said inserter tray comprising one or a plurality of inserter trays, and wherein when all the insert sheets stacked on said one or said plurality of inserter trays are exhausted while said second stacking manner is selected during outputting of said job and thereafter re-stacking of at least one insert sheet on said one or said plurality of inserter trays is detected by said insert sheet detector, said sheet feeder is controlled to start feeding the at least one insert sheet from said one or said plurality of inserter trays upon lapse of a predetermined period of time after the detection of re-stacking.

42. A sheet handling apparatus according to claim 34, further comprising a plurality of insert sheet detectors provided in a fashion corresponding respectively to said plurality of inserter trays, for detecting presence or absence of at least one insert sheet on said inserter trays, said at least two kinds of stacking manners including a first stacking manner in which a single type of insert sheets are stacked on said inserter tray, and a second stacking manner in which plural types of insert sheets are stacked on said inserter tray, said inserter tray comprising one or a plurality of inserter trays, and wherein when all the insert sheets stacked on said one or said plurality of inserter trays are exhausted while said second stacking manner is selected during outputting of said job and thereafter re-stacking of at least one insert sheet on said one or said plurality of inserter trays is detected by said insert sheet detector, said sheet feeder is controlled to start feeding the at least one insert sheet from said one or said plurality of inserter trays if restart of said job is instructed after the detection of re-stacking of the at least one insert sheet by said insert sheet detector.

43. A machine readable storage medium storing a program for controlling insert of insert sheets in a sheet handling apparatus comprising a receiving section that receives recording sheets transported from an image forming apparatus having an image forming section for forming an image on a sheet, at least one inserter tray for having the insert sheets stacked thereon, the insert sheets being insertable between the recording sheets transported from the image forming apparatus, a sheet feeder that feeds the insert sheets stacked on the inserter tray, and a transporting device that transports recording sheets received from the image forming apparatus and insert sheets fed from the inserter tray to a discharge tray, the program including codes for:

selecting a desired stacking manner from at least two kinds of stacking manners, for stacking the insert sheets on the inserter tray;

controlling the feeding of the insert sheets stacked on the inserter tray so that the insert sheets are inserted between the recording sheets transported from the image forming apparatus; and controlling the sheet feeder to feed the insert sheets from the inserter tray without interrupting a job being executed when insert sheets are re-stacked on the inserter tray after exhaustion of all the insert sheets stacked on the inserter tray while a predetermined stacking manner is selected by said stacking manner selecting code.

44. A sheet handling apparatus comprising:

a receiving section that receives recording sheets transported from an image forming apparatus having an image forming section for forming an image on a sheet;

a plurality of inserter trays that hold insert sheets;

a plurality of feeders that feed the insert sheets stacked on said inserter trays respectively;

a sheet feeding controller that controls feeding of the insert sheets stacked on said plurality of inserter trays so that the insert sheet is inserted between the recording sheets transported from the image forming apparatus;

a transporting device that transports recording sheets received from the image forming apparatus and insert sheets fed from at least one of said plurality of inserter trays to a discharge tray; and an instruction inputting terminal that inputs an instruction selecting one of a plurality of sheet feeding modes including a first mode for plural types of insert sheets stacked on said inserter trays respectively and a second mode for plural types of insert sheets stacked on at least one of said inserter trays, wherein said sheet feeding controller controls said feeders to sequentially feed the insert sheets from a different one of said inserter trays every time an insert sheet is fed, and controls said feeders to sequentially feed the insert sheets from only one of said inserter trays unless the one inserter tray is empty.

45. A machine readable storage medium storing a program for controlling a sheet handling apparatus including a receiving section that receives recording sheets transported from an image forming apparatus having an image forming section for forming an image on a sheet, a plurality of inserter trays that hold insert sheets, a plurality of feeders that feed the insert sheets stacked on the inserter trays respectively, and a transporting device that transports recording sheets received from the image forming apparatus and insert sheets fed from at least one of the plurality of inserter trays to a discharge tray, the program including codes for:

inputting an instruction selecting one of a plurality of sheet feeding modes including a first mode for plural types of insert sheets stacked on said inserter trays respectively and a second mode for plural types of insert sheets stacked on at least one of the inserter trays;

controlling the feeding of the insert sheets stacked on the plurality of inserter trays so that the insert sheet is inserted between the recording sheets transported from the image forming apparatus; and controlling the feeders to sequentially feed the insert sheets from a different one of the inserter trays every time an insert sheet is fed, and to sequentially feed the insert sheets from only one of the inserter trays unless the one inserter tray is empty.

* * * * *